United States Patent [19]

Ito

[11] Patent Number: 5,293,541
[45] Date of Patent: Mar. 8, 1994

[54] PICTURE QUALITY IMPROVING APPARATUS FOR COMPENSATING CONTOUR OF IMAGES

[75] Inventor: Shigehiro Ito, Toride, Japan

[73] Assignee: Victor Company of Japan, Ltd., Yokohama, Japan

[21] Appl. No.: 884,015

[22] Filed: May 18, 1992

[30] Foreign Application Priority Data

May 16, 1991 [JP] Japan .................................. 3-141116
May 21, 1991 [JP] Japan .................................. 3-145514

[51] Int. Cl.$^5$ ............................................. H04N 5/14
[52] U.S. Cl. .................................................... 348/625
[58] Field of Search ................... 358/166, 167, 36, 37, 358/162; H04N 5/14

[56] References Cited

U.S. PATENT DOCUMENTS

| 4,030,121 | 6/1977 | Faroudja ................................ 358/37 |
| 4,281,347 | 7/1981 | Tschannen ........................ 358/37 X |
| 4,918,528 | 4/1990 | Oohashi .......................... 358/166 X |
| 5,151,787 | 9/1992 | Park .............................. 358/166 X |
| 5,262,978 | 11/1993 | Ito ....................................... 364/825 |

Primary Examiner—Victor R. Kostak
Attorney, Agent, or Firm—Jacobson, Price, Holman & Stern

[57] ABSTRACT

The present invention relates to an improved image improvement apparatus which can be applied to video apparatus and to various other types of image processing apparatus. This invention has as an object the emphasis of the edge directly adding a waveform step difference to a middle position of a waveform change portion of an envelope of color signals in the form where they have been amplitude modulated, and therefore provides an apparatus which prevents unnatural contour compensation, improves color saturation phenomenon without giving an unnatural sensation to the viewer, facilitates the use of digital circuits and for which adjustment of the edge effect is possible. The control signals are obtained by control signal generating circuit and subtracters which use the input signals, output signals of a delay circuit, and output signals of a delay circuit. The output signals of a synthesizer are supplied to a signal selector circuit along with said signals. The signal selector circuit selects and outputs one of the three supplied signals in accordance with a control signal, and obtains an output signal for which the edge has been emphasized. The input signals, and each of the output signals of the delay circuits are supplied to a signal selector circuit. The control signal formation circuit and the subtracters use the signals to obtain the control signals. The signal selector circuit selects and outputs one of the supplied five signals in accordance with the control signal and obtains an output signal for which the edge has been emphasized.

6 Claims, 16 Drawing Sheets

PICTURE QUALITY IMPROVING APPARATUS FOR COMPENSATING CONTOUR OF IMAGES

BACKGROUND OF THE INVENTION

The present invention relates to picture quality improving apparatus applicable to various video devices and apparatus such as television (TV) image receiving apparatus, video tape recorders (VTR) and the like, and various image processing apparatus handling image data and the like. More particularly, the present invention relates to picture quality improving apparatus applicable to digital circuits and capable of improving a distinction and a resolution of represented images by means of an improvement of a color blur phenomenon. The improvement is performed by stressing an envelope edge of a chrominance signal whose amplitude is modulated such that a person watching a picture feels an intact picture without a sense of incongruity.

There has been conventionally performed contour compensation used for improving a picture quality in which a contour compensation component is obtained by a quadratic differential calculation to add the proper quantity of the component to an original signal. In contour compensation by the above method, a quadratic differential waveform as a contour compensation component has a peak which is considerably outside a midpoint of a change portion (edge portion) of a waveform of the original signal. Accordingly, when the quadratic differential waveform is added to the original signal, it is possible to generate a preshoot and an overshoot so as not to obtain a picture improving effect at a desired degree. Furthermore, it is possible to perform artificial contour compensation in that an edging of other colors such as white and black occurs at edges of the reproduced picture.

SUMMARY OF THE INVENTION

An object of the present invention is to provide a picture improving apparatus applicable to digital circuits and capable of improving a distinction and a resolution of represented images by means of an improvement of a color blur phenomenon, and the improvement is performed by stressing an envelope edge of chrominance signals of which an amplitude is modulated such that a person watching a picture feels an intact picture without a sense of incongruity.

In order to achieve the above object, a picture improving apparatus according to the present invention comprises a delay circuit which inputs a first signal modulated in amplitude by a modulated wave, generates a second signal in which the first signal is delayed a positive and integral number of the time it takes for of one cycle of the modulated wave, to occur and generates a third signal in which the second signal is delayed a positive and integral number of the time it takes for one cycle of the modulated wave, to occur thereby outputting the second and third signals; a first subtracter for outputting a fourth signal which is generated by subtracting the second signal from the first signal; a second subtracter for outputting a fifth signal which is generated by subtracting the third signal from the second signal; a third subtracter for outputting a sixth signal which is generated by subtracting the fifth signal from the fourth signal; a control signal generating circuit for outputting as a control signal a seventh signal which changes corresponding to a combination of values of the fourth, fifth and sixth signals supplied from the first to third subtracters; a composite circuit respectively outputting an eighth and a ninth signals responsive to the first, second and third signals, the eighth signal which is compounded by the first and second signals, and the ninth signal which is compounded by the second and third signals; and a signal selection circuit for selecting and outputting any of the eighth, second and ninth signal which are supplied from the delay circuit, and the composite circuit corresponding to the seventh signal as the control signal.

The control signal generating circuit causes the signal selection circuit to output the signal in which an edge of envelope of the first signal as an input signal by outputting as the control signal the seventh signal having three kinds as follows:

(i) when three signals of the fourth, fifth and sixth signals are the same polarity as each other, namely all positive polarity or all negative polarity at the same time, the seventh signal is a control signal to make the signal selection circuit select the ninth signal;

(ii) when both the fourth and fifth signals are the same polarity as each other, namely there is positive or negative polarity at the same time, and when the polarity of the sixth signal is different from the fourth and fifth signals, the seventh signal is a control signal to make the signal selection circuit select the eighth signal; and (iii) when the combination of the fourth, fifth and sixth signals is different from the combinations as the above items (i) and (ii), the seventh signal is a control signal to make the signal selection circuit select the second signal.

As one aspect of the present invention, the picture quality improving apparatus comprises delay circuits of an even number (2M, where M is an integral number more than two) which are connected in series and gives in turn an input signal a predetermined delay time;

a first signal group of an odd number (2M plus 1) including the input signal and an even number (2M) of output signals of the delay circuit;

a first subtracter group which is formed by connecting an even number (2M) of subtracters for each obtaining a first differential signal by calculating a difference between two signals in time adjacent in the first signal group;

a first differential signal group including the even number (2M) of the first differential signals which are obtained by the first subtracter group;

a second subtracter group which is formed by connecting an odd number (2M plus 1) of subtracters for each obtaining a second differential signal by calculating a difference between two signals in time adjacent in the first differential signal group;

a second differential signal group including the odd number (2M plus 1) of the second differential signals which are obtained by the second subtracter group;

a control signal generating circuit for obtaining a control signal which changes its value corresponding to combinations of the first and second differential signals in the first and second differential signal groups;

a signal selection circuit which is supplied the first signal group and control signal for selecting and outputting any one signal amongst the first signal group corresponding to the control signal in the manner of obtaining an output signal which is generated by adding a waveform step to a midpoint portion of a waveform change of the input signal.

As described above, the picture quality improving apparatus of this invention has several effects as follows:

(i) because the delay time of the delay circuit is set as a positive and integral number of the time it takes for one cycle of the modulated wave, to occur on or as an odd number of the time it takes for a ½ cycle of the modulated wave, and the edge stressing is performed by properly adding the waveform step to the midpoint of a slant portion of the envelope of the input signal which is modulated in amplitude (namely, the signal before modulated in amplitude), thereby obtaining an output signal in which frequency components are added without the frequency band of the input signal, it is possible to reduce color blur in the reproduced picture images and to stress the contour of the images;

(ii) the edge stressing is not performed over the amplitude of the original signal such as in conventional contour compensation, namely preshoot or overshoot, and is performed in the amplitude of the original signal. Accordingly, even though the apparatus and devices having this picture quality improving apparatus is formed by digital devices, there are no problem such as overflow, thereby performing good picture improvement by these apparatus and devices;

(iii) because degrees of edge stressing to the input signal depend on a frequency including the input signal and have an intimate correlation, the picture quality improving apparatus can improve a distinction and resolution and does not give a person watching the reproduced picture a sense of incongruity;

(iv) even though the composite ratio is regulated between the delay time of the delay circuit and the composite circuit, it is possible to regulate an edge stressing quantity, so that a person watching the picture can set the picture quantity to the desired quantity, namely optimum edge stressing quantity coincident to his liking with watching a signal waveform and reproduced picture;

(v) since each component in the picture quality improving apparatus is realized using simple circuitry generally available on the market such as integrated circuits (IC), it is possible to easily manufacture the entire apparatus at low cost. Furthermore, since the picture quality improving apparatus has a wide usage, the apparatus is useful in various industries; and (vi) when the constants α and β are set for eliminating noise components in the control signal generating circuit, the picture quality improving apparatus can obtain a more perfect control signal Sc which is not influenced by the noise components, thereby performing more precise edge stressing.

Furthermore, the picture quality improving apparatus of the present invention as one aspect, has effects as follows:

(vii) an edge stressing is performed by adding a proper waveform step to a midpoint of a slant portion of the waveform of the input signal. As a result, it is possible to obtain the output signal added frequency components outside the frequency band of the input signal. Furthermore, since the pseudo-contour such as a preshoot and overshoot is not added to the output signal, it is possible to perform a precise contour compensation without a sense of incongruity;

(viii) this apparatus performs edge stressing within an amplitude of the original signal and does not perform the edge stressing over the amplitude of the original signal, such as preshoot and overshoot in the conventional contour compensation. Accordingly, when this apparatus is disposed in digital apparatus and devices, the problem of overflow does not occur, and the apparatus and devices can perform extreme picture quality improvement;

(ix) since the degree of edge stressing to the input signal depends on the frequency included in the input signal and has a perfect correlation with the input signal, the picture quality improving apparatus does not give a sense of incongruity to a person watching the reproduced picture, and it is possible to improve a distinction and resolution;

(x) if the number of the delay circuits is regulated, it is possible to control the edge stressing quantity, so that a person watching the picture can set the optimum edge stressing quantity coincident to his liking, namely his desired picture quality; and (xi) each component of the picture quality improving apparatus is realized using simple circuitry generally available on the market such as integrated circuits (IC), it is possible to easily manufacture the entire apparatus at low cost. Furthermore, since the picture quality improving apparatus has a wide usage, the apparatus is useful in various industries.

DETAILED DESCRIPTION OF THE PREFERRED EMBODIMENTS

The following is a description of the preferred embodiments of this invention.

Figure 1:
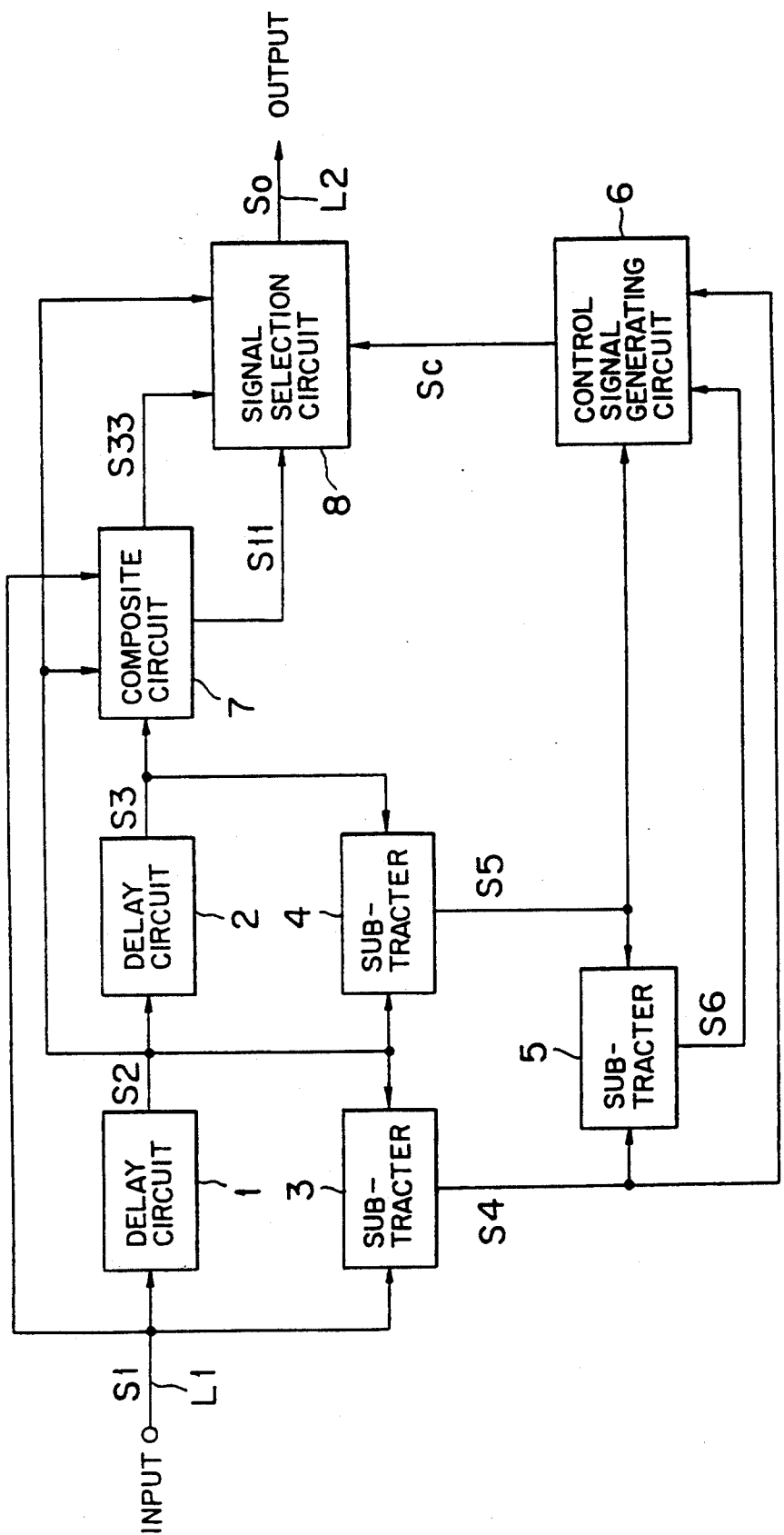
FIG. 1 is a block diagram showing a schematic configuration of a picture quality improving apparatus according to a first embodiment of the present invention.

At first, there is described a picture quality improving apparatus according to a first embodiment of this invention with reference to FIG. 1. In FIG. 1, numerals 1 and 2 denote delay circuits having the same delay time, respectively, 3 to 5 subtracters, 6 a control signal generating circuit, 7 a composite circuit, and 8 a signal selection circuit.

For the sake of convenience in a description, there is omitted a signal delay which is caused by the processing time of each circuit and a delay circuit or the like which is used only for compensating the signal delay. Furthermore, an input signal dealt in this picture quality improving apparatus is supposed as the signal that is a signal modulated in amplitude such as a chrominance signal in television signals and the like.

Figure 2:
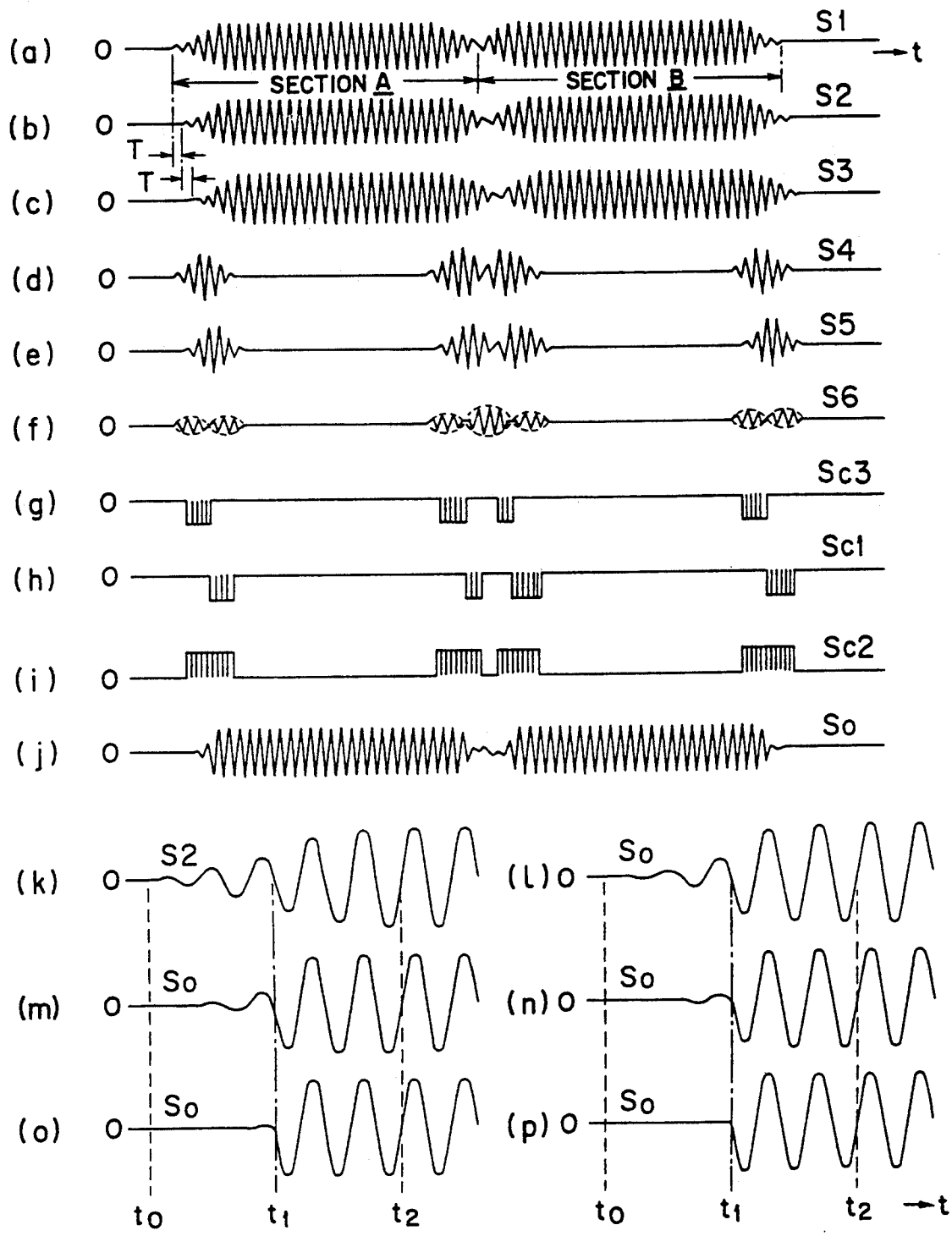
FIGS. 2(a) to 2(p) are characteristic diagrams for respectively explaining operation of the picture quality improving apparatus shown in FIG. 1.

It is supposed that there is supplied an input signal S1 as a chrominance signal of the television signals shown in FIG. 2(a) through a line L1. The signal S1 has a waveform resulting from suppressed-carrier amplitude modulation of a chrominance subcarrier wave (a frequency fsc of the chrominance subcarrier wave is about 3.58 MHz in the NTSC system), a phase in a section A is $\phi$, and a phase in a section B is $\phi + \pi$. In a boundary of the sections A and B, an amplitude is small because there is duplication of both the sections A and B. The input (chrominance) signal S1 has an I signal which is limited in the 1.5 MHz band and a Q signal which is limited in the 0.5 MHz band in a base band system before modulated.

The input signal S1 is supplied to the delay circuit 1 having a delay time T which is obtained by an equation (1) as follows:

$$T = 1/fsc \quad (1)$$

where fsc is about 3.58 MHz.

A value of the delay time T corresponds to one cycle or period of the chrominance subcarrier wave.

$$T = m/fsc \quad (2)$$

where m is 1, 2, 3 . . . an integral value.

Even though the delay time T can extend to the value obtained by an equation (2) in the first embodiment, the delay time T obtained by the equation (1) is first described. The delay circuit 1 outputs a signal S2 which delays in time T and is shown in FIG. 2(b).

The delay circuit 2 of the next step has the same function as the delay circuit 1, and outputs a signal S3 which further delays time T from the signal S2 and is shown in FIG. 2(c).

The subtracter 3 subtracts the signal S2 of the delay circuit 1 from the input signal S1 to generate and output a signal S4 obtained by an equation (3) as follows:

$$S4 = S1 - S2 \quad (3)$$

The subtracter 4 has the same function as the subtracter 3 and subtracts the signal S3 of the delay circuit 2 from the signal S2 of the delay circuit 1 to generate and output a signal S5 obtained by an equation (4) as follows:

$$S5 = S2 - S3 \quad (4)$$

The subtracter 5 also has the same function as the subtracter 3 and subtracts the signal S5 of the subtracter 4 from the signal S4 of the subtracter 3 to generate and output a signal S6 obtained by an equation (5) as follows:

$$S6 = S4 - S5 \quad (5)$$

The signals S4, S5 and S6 have waveforms which are respectively shown in FIGS. 2(d), 2(e) and 2(f). The characteristics of these waveforms are to obtain a significant value in the waveform change portion in the envelope of the chrominance signal. The frequency characteristics of the subtracters 3 to 5 are differential features G1 of the sine wave amplitude obtained by an equation (6) are as follows:

$$G1 = j2 \sin(\pi f/fsc) \quad (6)$$

Assuming the signal S2 as a time reference, the signal S4 is advanced by the time T/2, the signal S5 is retarded by the time T/2, and the signal S6 has no time difference. The signal S6 is explained by S1, S2 and S3 after the equations (3) and (4) are substituted for the equation (5). The frequency characteristics G2 of the signal S6 are obtained by an equation (7) as follows:

$$G2 = 2(\cos(2\pi f/fsc) - 1) \quad (7)$$

Accordingly, the delay circuit 1 and 2 and the subtracters 3 to 5 function as a comb filter of the same phase. Anyway, since a subtracting operation between the signals is performed by using the time difference which is equal to the period T of the chrominance subcarrier wave, the same time difference T, the operation is to obtaining a difference between the signals having the same polarity. This corresponds to obtain the change of the envelope of the chrominance signal.

The signal S4, S5 and S6 of the subtracters 3, 4 and 5 are supplied to the control signal generating circuit 6 of the next step. The circuit 6 generates a control signal Sc corresponding to the combinations of values of the signals S4, S5 and S6. The control signal Sc is a logic signal comprised of signals Sc1, Sc2 and Sc3 which are shown in an equation (8) as follows:

$$
\begin{aligned}
Sc1 &= \begin{cases} 0 \text{ (Low)} & \text{when } S4 \text{ and } S5 \text{ has the same} \\ & \text{polarity different from } S6 \text{ and} \\ & \text{not "0"} \\ 1 \text{ (High)} & \text{when the condition above is not met} \end{cases} \\
Sc2 &= \begin{cases} 0 \text{ (Low)} & \text{when both } Sc1 \text{ and } Sc3 \text{ are "1"} \\ & \text{(high)} \\ 1 \text{ (High)} & \text{when at least one of } Sc1 \text{ and} \\ & Sc3 \text{ is "0" (low)} \end{cases} \\
Sc3 &= \begin{cases} 0 \text{ (Low)} & \text{when } S4, S5 \text{ and } S6 \text{ have the same} \\ & \text{polarity and not "0"} \\ 1 \text{ (High)} & \text{when the condition above is not met} \end{cases}
\end{aligned} \quad (8)
$$

As described above, the conditions are as follows:

(i) when the signals S4, S5 and S6 all have the same positive or negative polarity, the signal Sc1 is "0" (Low);

(ii) when both the signals S4 and S5 are of the same positive or negative polarity, and the signal S6 has the polarity different from the signal S4 and S5, the signal Sc1 is "0" (Low); and (iii) when the combinations of the signals S4, S5 and S6 are different from the above conditions, the signal Sc2 is "0" (Low).

Figure 3:
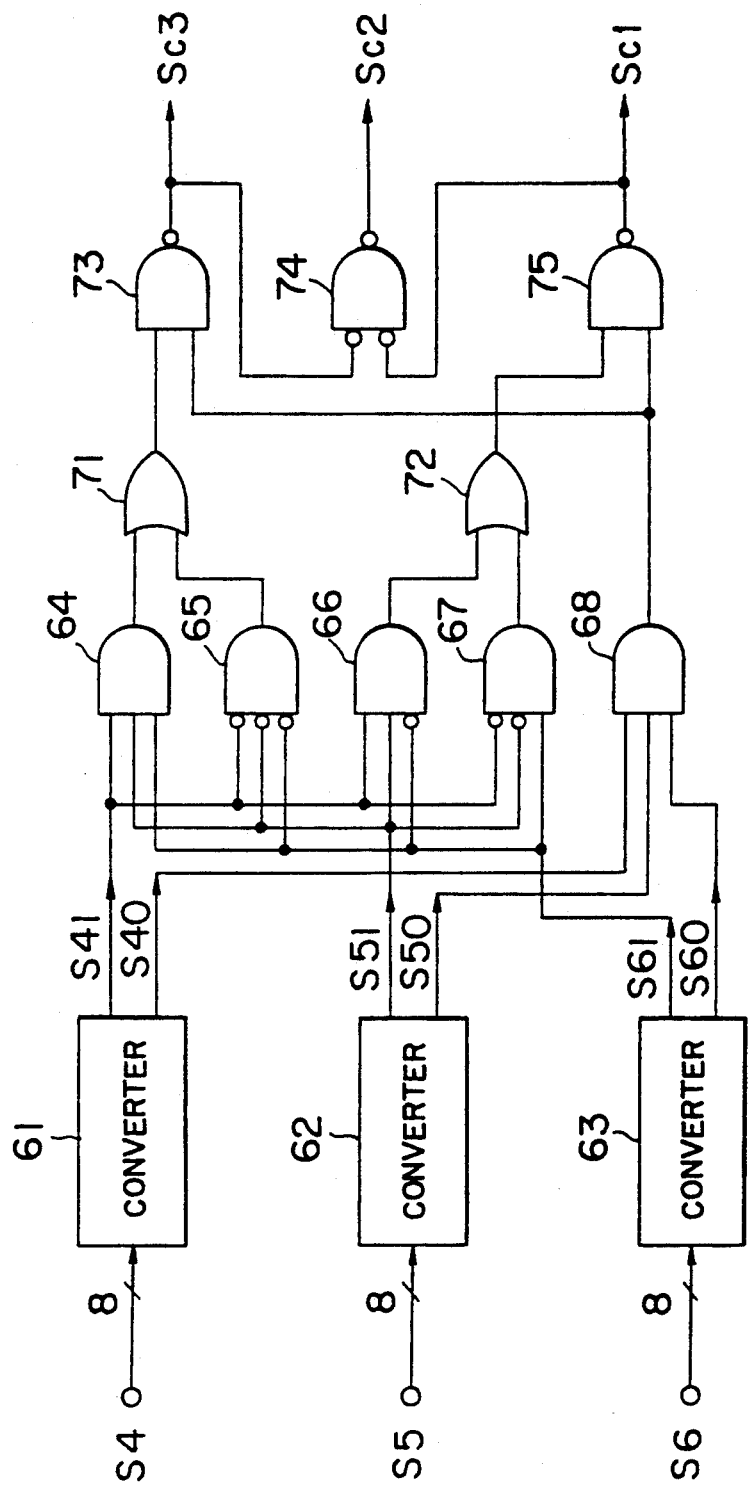
FIG. 3 is a circuit diagram showing a control signal generating circuit in the apparatus shown in FIG. 1.

FIG. 3 shows an exemplary circuit for realizing the control signal generating circuit 6. In FIG. 3, converters 61, 62 and 63 respectively convert the signals S4, S5 and S6 (which are digital signals having 8 bits that are a complement of 2) into "1" when the signals are positive and "−1" when negative, so as to output it as a 2 bit signal representing a complement of 2. Tables 1(a), 1(b) and 1(c) show conversion tables of the respective converters 61, 62 and 63, and the signals S4, S5 and S6 are obtained by an equation (9) as follows:

TABLE 1

| (a) | | (b) | | (c) | |
|---|---|---|---|---|---|
| S41 | S40 | S51 | S50 | S61 | S60 |
| S4 > 0 | 0 | 1 | S5 > 0 | 0 | 1 | S6 > 0 | 0 | 1 |
| S4 = 0 | 0 | 0 | S5 = 0 | 0 | 0 | S6 = 0 | 0 | 0 |
| S4 < 0 | 1 | 1 | S5 < 0 | 1 | 1 | S6 < 0 | 1 | 1 |

$$\left. \begin{array}{l} S4 = -2^0 S41 + 2^{-1} S40 \\ S5 = -2^0 S51 + 2^{-1} S50 \\ S6 = -2^0 S61 + 2^{-1} S60 \end{array} \right\} \quad \ldots (9)$$

The converter 61, 62 and 63 are formed from a table look up system such as by a TTL-IC (transistor-transistor-logic integration circuit) or a ROM (read only memory) and a PLA (programmable logic array).

Output signals of three converters 61, 62 and 63 are respectively passed through AND circuits 64 to 68, OR circuits 71 and 72, and NAND circuits 73, 74 and 75 to be the control signals Sc1, Sc2 and Sc3 which are obtained by an equation (10):

$$\left. \begin{array}{l} \overline{Sc1} = \overline{(S40 \times S50 \times S60) \times (S41 \times S51 \times \overline{S61} + \overline{S41} \times \overline{S51} \times S61)} \\ \overline{Sc2} = \overline{(S40 \times S50 \times S60) \times (S41 \times S51) + (\overline{S41} \times \overline{S51})} \\ \overline{Sc3} = \overline{(S40 \times S50 \times S60) \times (S41 \times S51 \times S61 + \overline{S41} \times \overline{S51} \times \overline{S61})} \end{array} \right\} \quad (10)$$

In FIG. 3, the signals Sc1, Sc2 and Sc3 are denoted simply by name, and in the equation (10) these signals are represented by logical equation of the low active (negative logic), namely adding bars, in order to clarify usage object.

Since the signals S4, S5 and S6 are the output signals of the subtracters 3, 4 and 5, it is generally possible to include noise components of the high frequency wave. In order to improve performance of the control signal generating circuit 6 to the noise component, reference values for distributing the signals S4, S5 and S6 in the converters 61, 62 and 63 are not used as "0" as shown in Tables 1(a), 1(b) and 1(c), but are set as small positive constants $\alpha$ and $\beta$ which distribute the signals S4, S5 and S6. The constants $\alpha$ and $\beta$ are those of values corresponding to amplitudes of the noise component. Tables 2(a), 2(b) and 2(c) show conversion tables of the converters 61, 62 and 63 to which noise measures are taken, and a table 3 shows logic values and conditions of each signals:

TABLE 2

| (a) (LSB) | | | (b) (LSB) | | | (c) (LSB) | | |
|---|---|---|---|---|---|---|---|---|
| | S41 | S40 | | S51 | S50 | | S61 | S60 |
| S4 > $\alpha$ | 0 | 1 | S5 > $\alpha$ | 0 | 1 | S6 > $\beta$ | 0 | 1 |
| \|S4\| ≦ $\alpha$ | 0 | 0 | \|S5\| ≦ $\alpha$ | 0 | 0 | \|S6\| ≦ $\beta$ | 0 | 0 |
| S4 < −$\alpha$ | 1 | 1 | S5 < −$\alpha$ | 1 | 1 | S6 < −$\beta$ | 1 | 1 |

TABLE 3

| CONTROL SIGNAL | LOGIC VALUE | CONDITIONS |
|---|---|---|
| Sc3 | 0 (Low) | S4 > $\alpha$, S5 > $\alpha$, S6 > $\beta$, or S4 < −$\alpha$, S5 < −$\alpha$, S6 < −$\beta$ |
| | 1 (High) | Except the above condition |
| Sc2 | 0 (Low) | Both Sc1 & Sc3 are 1 (High) |
| | 1 (High) | At least any one of Sc1 & Sc3 is 0 (Low) |
| Sc1 | 0 (Low) | S4 > $\alpha$, S5 > $\alpha$, S6 < −$\beta$, or S4 < −$\alpha$, S5 < −$\alpha$, S6 > $\beta$ |
| | 1 (High) | Except the above condition | where $\alpha$ and $\beta$ in Table 3 are small positive constants for removing a noise component.

The constants $\alpha$ and $\beta$ are values smaller than the signals S4, S5 and S6 and set for removing noise components. By this, there are eliminated noise components in which amplitude values in the signals S4 and S5 are less than $\alpha$, and an amplitude value in the signal S6 is less than $\beta$. Accordingly, more precise control signal Sc can be obtained without an influence by the noise components. It is no problem that the signal component is lost with the noise component if the lost component is limited under several % of the original signal.

Here, the description returns FIG. 1 and the signals S1, S2 and S3 are supplied to the composite circuit 7 of the next step.

$$\left. \begin{array}{l} S11 = (1 - k) \times S1 + k \times S2 \\ S33 = (1 - k) \times S3 + k \times S2 \end{array} \right\} \quad (11)$$

Figure 4A:
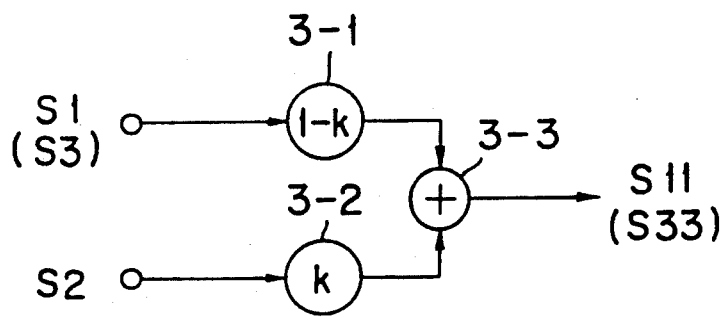
FIGS. 4(a) to 4(e) are circuit diagrams respectively showing a specific example of a composite circuit in the apparatus shown in FIG. 1.

In this section, the signals S1 and S3 are respectively converted into new signals S11 and S33 through a composite ratio k as the above equation (11). FIG. 4(a) shows a specific circuit for realizing the equation (11). In FIG. 4(a), blocks 3-1 and 3-2 denote amplifiers of a table look-up system which are comprised of a ROM, and a block 3-3 denotes an adder. The adder 3-3 composes the signal S11 (or S33) by adding the signal S2 supplied to the amplifier 3-2 and the signal S1 (or S3) supplied to the amplifier 3-1.

The signals S11 and S33 outputted from the composite circuit 7, the signal from the delay circuit 1 and the control signal Sc (Sc1, Sc2 and Sc3) are supplied to the signal selection circuit 8 as the next step. The circuit 8 selects any one of the signals S11, S2 and S33 corresponding to the control signal Sc so as to output a signal So which is obtained by an equation (12) as follows:

$$So = \begin{Bmatrix} S11 \ (Sc1 = 0) \\ S2 \ (Sc2 = 0) \\ S33 \ (Sc3 = 0) \end{Bmatrix} \quad (12)$$

Namely, the signal selection circuit 8 selects and outputs the signal S11 when the control signal Sc1 is "0" (Low), the signal S2 when the control signal Sc2 is "0" (Low), and the signal S33 when the control signal Sc3 is "0" (Low).

Figure 5A:
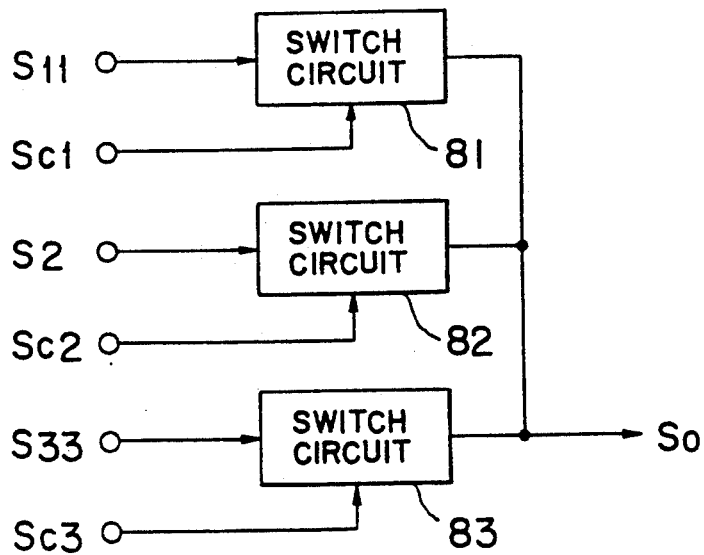
FIGS. 5A and 5B are circuit diagrams each showing a specific example of a signal selection circuit of the apparatus shown in FIG. 1.

FIG. 5A shows a circuit example for realizing the signal selection circuit 8. In FIG. 5A, numerals 81 to 83 denote switch circuits which are respectively supplied the signals S11, S2 and S33. When any one of the control signals Sc1, Sc2 and Sc3 is "0" (Low), any one of the switch circuits 81 to 83 to which the control signal of "0" is supplied, is turned on so as to output as the signal So any one of signals S11, S2 and S33 through a shared output terminal.

Figure 5B:
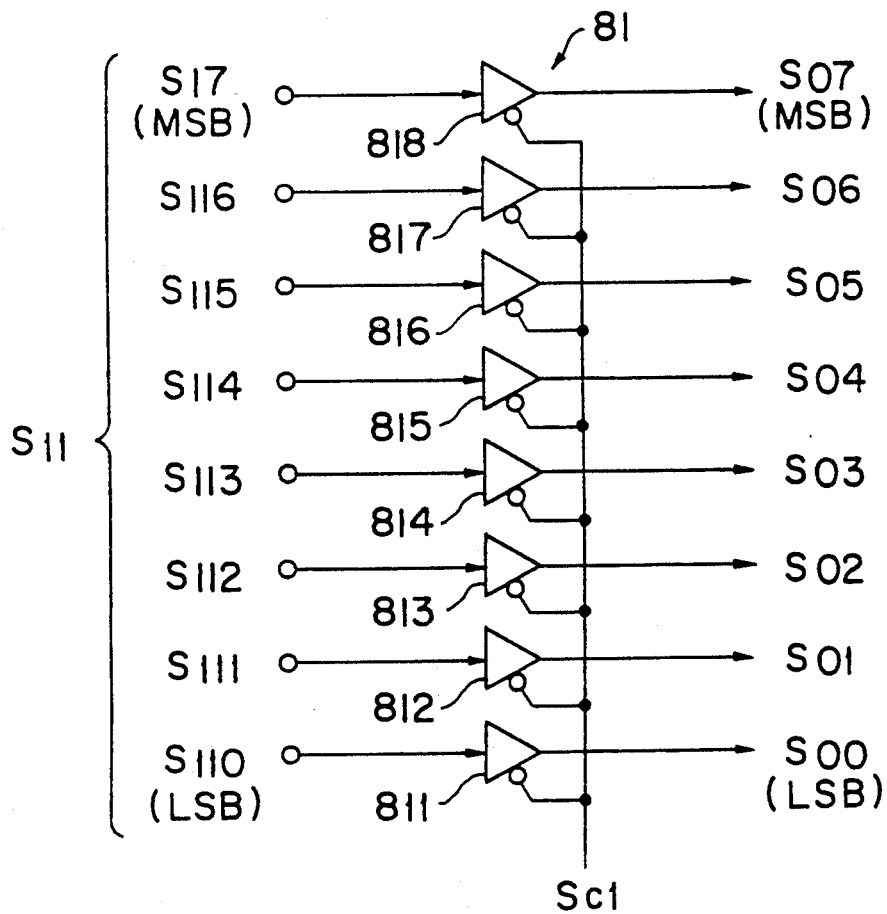

The switch circuits 81, 82 and 83 have the same configuration as each other. FIG. 5B shows the specific circuit example of the switch circuit 81 as the representative of the switch circuits 81 to 83. Here, the signals S11 and So are 8 bit and a complement of 2. In FIG. 5B, blocks 811 to 818 denote buffer circuits each having a control terminal and circuits 811 to 818 have a shared control terminal to which the control signal Sc1 is supplied. When the control signal Sc1 is "0" (Low), the input signal S11 that is signals S110 (LSB) to S117 (MSB) is outputted as it is, namely as the output signal So that is signals S00 (LSB) to S07 (MSB). When the control signal Sc1 is "1" (High), an output is a tri state or a high impedance condition.

The output signal So which is obtained by the above steps and also is an output of the picture quality improving apparatus, is shown as the waveform of FIG. 2(j). Where this waveform chart is drawn in the manner that a value of the composite ratio k of the composite circuit 7 is "0".

When the output signal So is compared with the input signal S1, the signal So is understood that a waveform step is added to a substantial midpoint of the waveform change (edge) portion of the envelope of the input waveform of the signal S1, the waveform change of the envelope is shaped sharply, and the edge is properly stressed. If the output signal So is reproduced, there can be obtained the reproduced picture in which the contour is compensated and the color blur improved.

Furthermore, in this picture quality improving apparatus, edge stressing is performed within an amplitude of the original and is not over the amplitude of the original signal such as the preshoot and the overshoot which occur in the conventional contour compensation, as understood from the output waveform So shown in FIG. 2(j). Accordingly, in the case that the apparatus and devices including this picture quality improving apparatus are comprised of digital circuits, the problem of overflow does not occur and the apparatus and devices perform an extreme improvement for a picture quantity.

As described above, since the signal So outputted from the line L2 is stressed by the edge, there is the signal to which a spectrum over the original band of the signal S1 is newly added. The new addition of the spectrum gives a person watching the reproduce picture image an impression that the resolution of the original signal is improved and this additional spectrum functions to improve the picture distinction.

When the value of the composite ratio k in the composite circuit 7 increases from the minimum value "0" to the maximum value "1", an edge stressed amount decreases. Accordingly, the picture quality improving apparatus can set the edge stressed amount coincident to a liking of a person watching the picture image by means of the regulation of the value of the composite ratio k.

FIG. 2(k) shows a diagram of the rising waveform of the signal S2 (the chrominance signal) in which the time axis is extended. When the delay circuits 1 and 2 of the first embodiment (see FIG. 1) having the delay time of the value obtained by the equation (1) perform the edge stressing for the signal S2, the output signal So shown in FIG. 2(m) is obtained. On the contrary, when the circuit 1 and 2 having the value which is obtained by the equation (2), namely, m is 2, perform the edge stressing, there can be obtained the signal So shown in FIG. 2(o). Clearly, the signal So in FIG. 2(o) has the edge sharper than the signal So in FIG. 2(m) at the rising portion of the envelope of the waveform. If the delay time of the delay circuits 1 and 2 is set to integral number times of the cycle of the chrominance subcarrier wave (the modulation wave), the change portion of the envelope of the chrominance can be sharpened.

Figure 6:
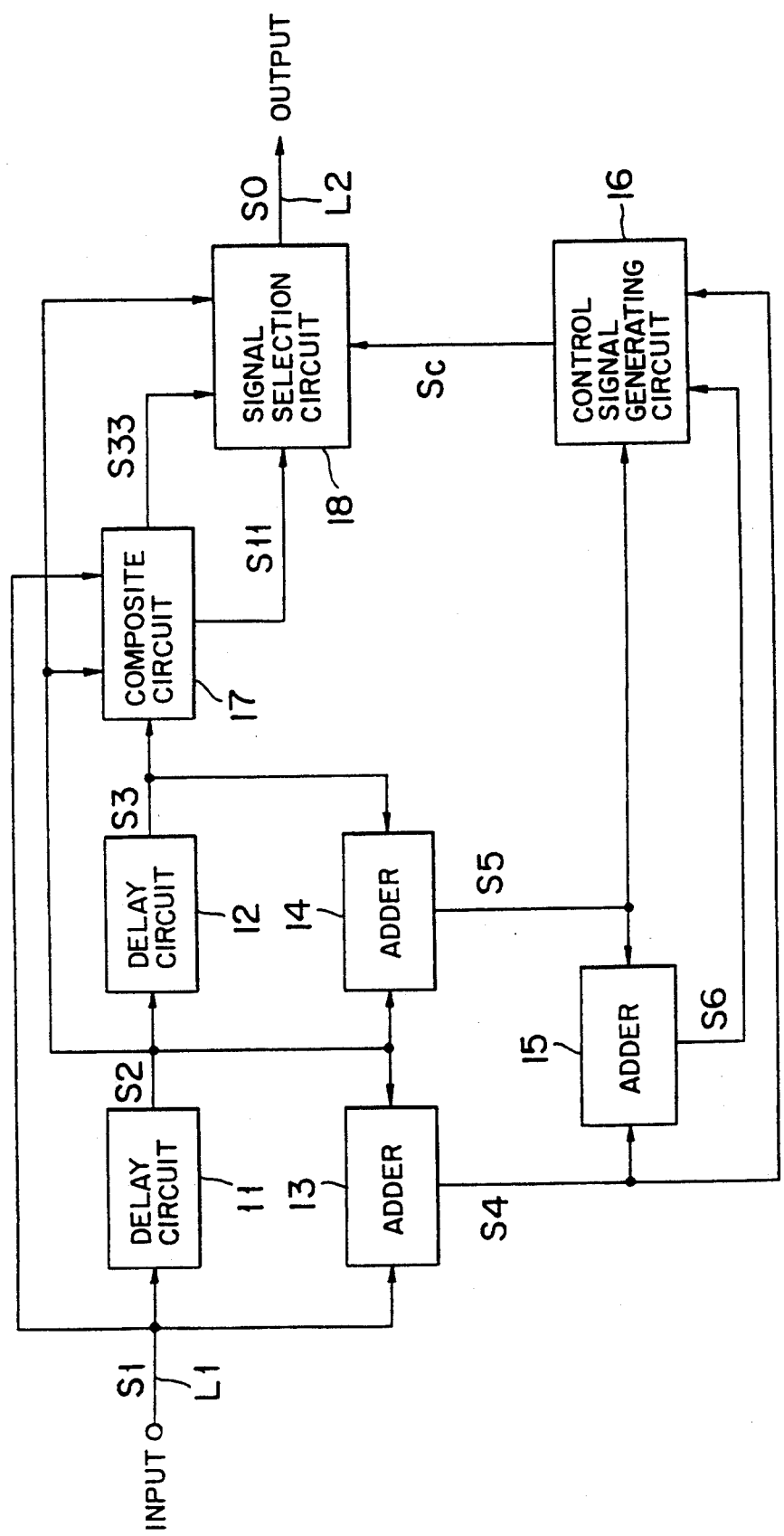
FIG. 6 is a block diagram showing a schematic configuration of a picture quality improving apparatus according to a second embodiment of the present invention.

Next, FIG. 6 shows a picture quality improving apparatus according to a second embodiment. Numerals 11 and 12 denote delay circuits having the same delay time, 13 to 15 denote adders, 16 denotes a control signal generating circuit, 17 denotes a composite circuit, and 18 denotes a signal selection circuit. In the second embodiment, an entire configuration is substantially the same as the first embodiment without using a delay time in the delay circuits 11 and 12 which is obtained by an equation (13) below different from the delay time in the circuit 1 and 2 which is obtained by the equation (1).

$$T = 1/(2f_{sc}) \quad (13)$$

Here, a half cycle of the chrominance subcarrier wave is the basic delay time. An expansion equation corresponding to the equation is the following equation (14) by which the delay time can be set odd number times of the half cycle of the chrominance subcarrier wave.

$$T = n/(2f_{sc}) \quad (14)$$

where n = 1, 3, 5, . . . odd numbers.

The difference between the first and second embodiments resides in that the adders 13 to 15 are used in the place of the subtracters 3 to 5 in order to obtain the change of the envelope component by using the values of the signals S1 to S3 which have the distance of the half cycle of the chrominance signal. The adders 13 to 15 perform the operation shown in equations (15), (16) and (17), thereby obtaining the signals S4, S5 and S6.

$$S4 = S1 + S2 \quad (15)$$

$$S5 = S2 + S3 \quad (16)$$

$$S6 = S4 + S5 \quad (17)$$

The signal S6 has the polarity opposite to the signal S6 which is obtained by the equation (6). Accordingly, the converters 61, 62 and 63 use the conversion table for making the signal 2 bit of Tables 4(a), 4(b) and 4(c) in the place of the Tables 1(a), 1(b) and 1(c).

TABLE 4

| (a) | | (b) | | (c) | |
|---|---|---|---|---|---|
| S41 | S40 | S51 | S50 | S61 | S60 |
| S4 > 0 | 0 | 1 | S5 > 0 | 0 | 1 | S6 > 0 | 0 | 1 |
| S4 = 0 | 0 | 0 | S5 = 0 | 0 | 0 | S6 = 0 | 0 | 0 |
| S4 < 0 | 1 | 1 | S5 < 0 | 1 | 1 | S6 < 0 | 1 | 1 |

The control signal generating circuit 16 has the same function as the circuit 6 shown in FIG. 1.

In the place of the equation (11), the composite circuit 17 performs an operation by using an equation (18) so as to obtain the signals S11 and S33.

$$S11 = (k-1) \times S1 + k \times S2 \atop S33 = (k-1) \times S3 + k \times S2 \quad \bigg\} \quad (18)$$

where k is a composite ratio in condition $0 \leq k \leq 1$.

Figure 4B:
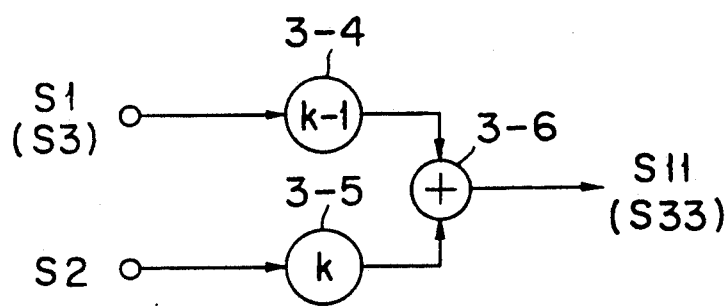

A specific example of the composite circuit 7 is shown in FIG. 4(b). The amplifier 3-4 multiplies the signal S1 (S3) by "k−1" times, and the amplifier 3-5 multiplies the signal S2 by "k" times. The outputs of these two amplifiers are used as composing signals at an adder 3-6.

The signal selection circuit 18 has the same configuration as the first embodiment shown in FIG. 1.

FIG. 2(k) is a diagram of the waveform showing the rising portion of the chrominance signal in which a time axis of the signal S2 is extended. The delay circuits 11 and 12 of the second embodiment having a delay time represented by an equation (13) perform the edge stressing to the signal S2, thereby obtaining the output signal So shown in FIG. 2(l). Next, the delay circuits 11 and 12 set "n" to 3 in the equation (14), thereby obtaining the output signal So as shown in FIG. 2(n). Furthermore, if "n" is set to 5, the output signal So is obtained as shown in FIG. 2(p). As clarified from the figures, the rising portion of the waveform in FIG. 2(n). is sharper than that in FIG. 2(l), and that of FIG. 2(p) is sharper than FIG. 2(n). Accordingly, if the delay time of the delay circuits 11 and 12 are set to odd number times of the half cycle of the chrominance carrier signal (the modulation wave), it is possible to sharpen the change portion of the envelope of the chrominance signal.

The odd number value n in the equation (14) and the integral number value m in the equation (2) as parameters should be determined corresponding to a band width of the signal before modulated the amplitude of the input signal S1 (namely the envelope of the input signal S1), that is the spectrum component included in the signal S1. In the case that the chrominance signal of the television signal is an object for edge stressing, n is limited to 5 and m is to 2.

Figure 7:
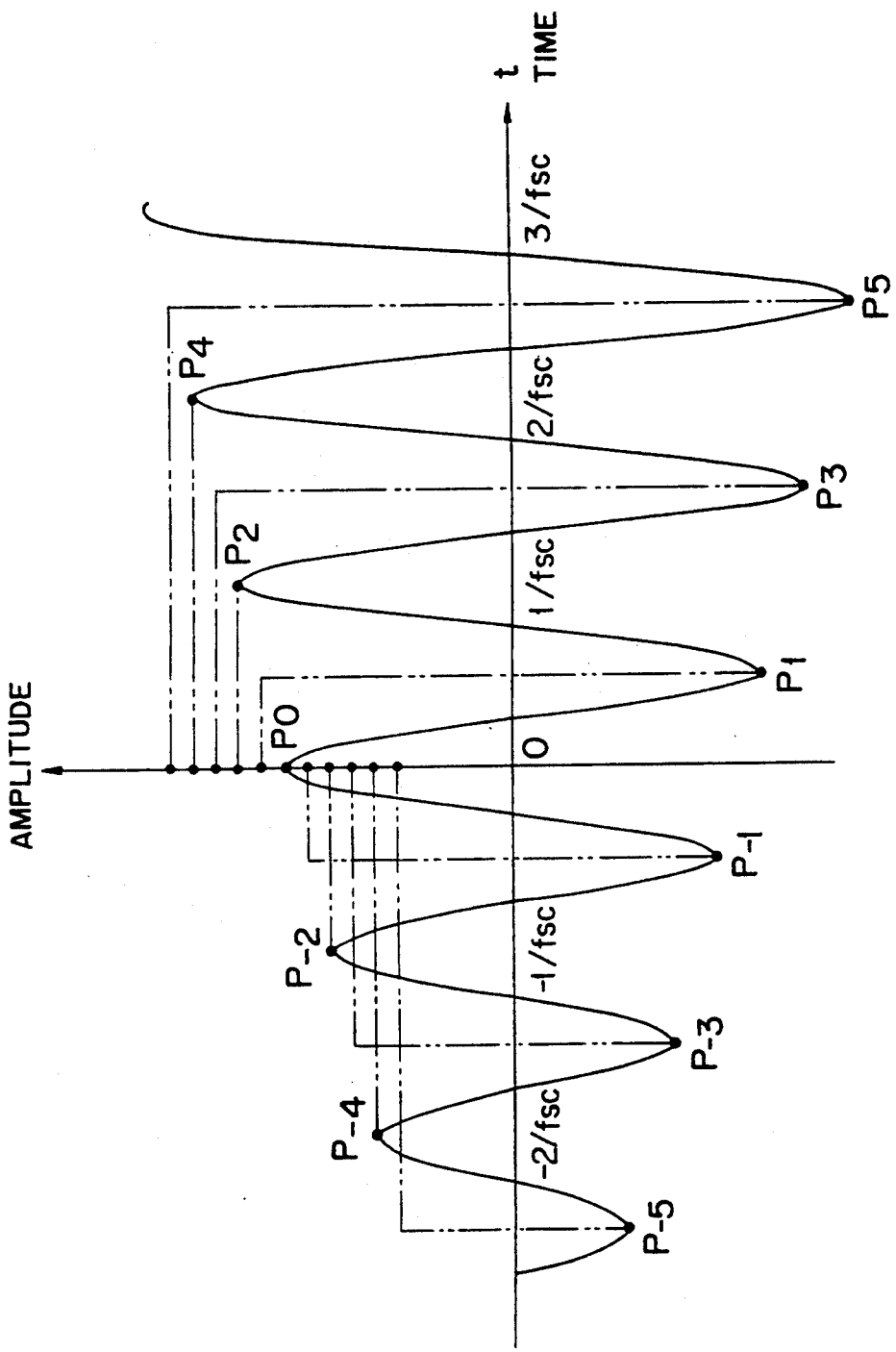
FIG. 7 is a characteristic diagram showing a waveform of a chrominance signal of the apparatus shown in FIG. 6.

Here, FIG. 7 shows a waveform diagram of several cycles of the signal S1 (the chrominance signal) which is inputted after modulating an amplitude. The first embodiment shown in FIG. 7 has a value P0 as an object of the edge stressing is displaced by a value Pn (n = −4, −2, 2, and 4) which is distant from the integral number times of the cycle (1/fsc) of the chrominance subcarrier wave (the modulation wave) or displaced by a composite value of the values P0 and Pn. On the other hand, the second embodiment shown in FIG. 6 has a value P0 as an object of the edge stressing, displaced by a value having the polarity opposite to Pn (n = −5, −3, −1, 1, 3, and 5) which is distant from the odd number times of the half cycle {1/(2fsc)} of the chrominance subcarrier wave (the modulation wave) or displaced by a composite value of the values P0 and Pn having the opposite polarity. By this, there is a sharpened change portion of the envelope of the chrominance signal S1 supplied after modulating an amplitude, that is the waveform change portion of the original chrominance signal before modulating an amplitude.

$$S11 = S1 - k \times (S1 - S2) \atop S33 = S3 - k \times (S2 - S3) \quad \bigg\} \quad (19)$$

The equation (11) in the composite circuit 7 of the first embodiment shown in FIG. 1 can be displaced by an equation (19). Namely, the composite circuit 7 can be constructed by using signals outputted from the subtracters 3 and 4 in the place of the signal S2, that is "S1−S2" (=S4) and "S2−S3" (=S5).

Figure 4C:
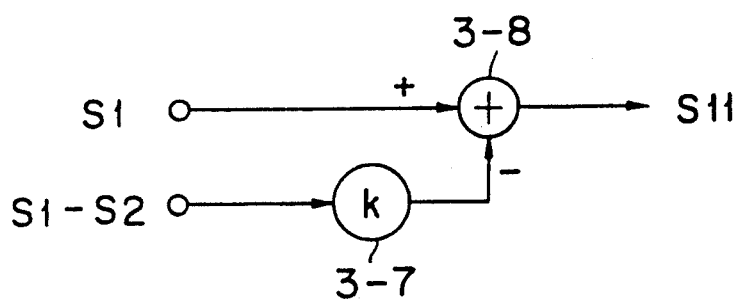
Figure 4D:
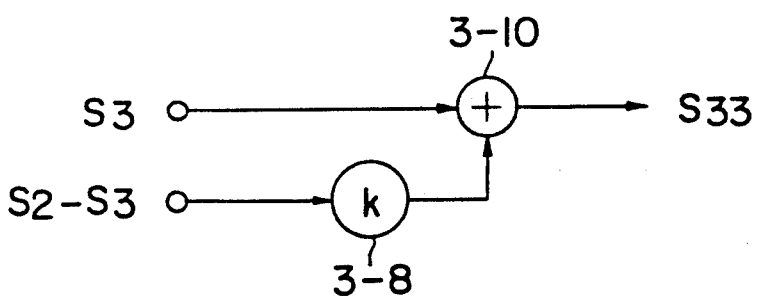

FIG. 4(c) shows a configuration of the composite circuit 7 in which the signal "S2−S3 (=S5)" is multiplied by k in the amplifier 3-7 and the subtracter 3-8 subtracts the signal S1 from the multiplied result, and FIG. 4(d) shows a configuration of the composite circuit 7 in which the signal "S2−S3" is multiplied by k in the amplifier 3-9 and the adder 3-10 adds the multiplied result with the signal S3.

$$S11 = -S1 + k \times (S1 + S2) \atop S33 = -S3 + k \times (S2 + S3) \quad \bigg\} \quad (20)$$

Figure 4E:
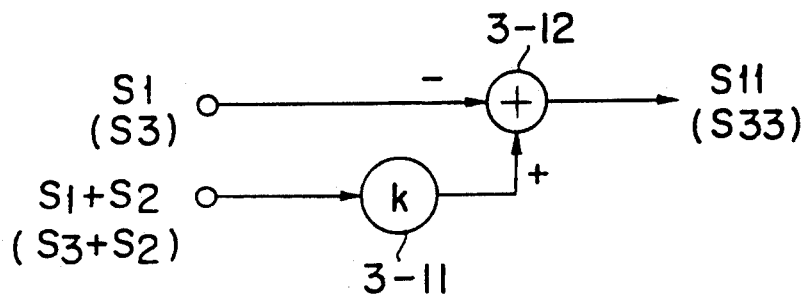

The equation (18) in the composite circuit 7 shown in FIG. 6 representing the second embodiment, can be transformed to an equation (20) written above, and the circuit 7 calculates by using the outputs of the adders 13 and 14 in the place of the signal S2, that is, "S1+S2 (=S4)" and "S2+S3 (=S5)". FIG. 4(e) shows a configuration of the composite circuit 7 in which the signal "S1+S2" (or "S2+S3") is multiplied by k in the amplifier 3-11 and the subtracter 3-12 subtracts the signal S1 (or S3) from the multiplied result.

Here, the sharpness of the change portion of the envelope (degrees of the edge stressing) of the output signal So depends on the frequency characteristics within the change portion of the envelope in the original signal S1 before stressing the edge (namely, the waveform of the chrominance signal before modulating the amplitude). If the leading and trailing edge portions of the envelope of the original signal S1 have sharper slants, edge stressing is performed to a stronger degree, but to a weaker degree for gentler slants.

As described above, since the degrees of the edge stressing depend on the frequency of the input signal and have the complete correlation with the input signal without delay times of the delay circuit 11 and 12 and the composite ratio k of the composite circuit 7, this picture quality improving apparatus does not give a person watching the reproduced picture a sense of incongruity and he senses intact pictures, thereby improving a distinction and a resolution.

Furthermore, as each component of the shown embodiments is comprised itself of simple circuitry such as general articles, for example, IC and the like on the markets, it is possible to manufacture the entire apparatus and devices at low cost.

Even though the above embodiments use the chrominance signals of the television signals as the input signal, the picture quality improving apparatus of the present invention can process other signals in which the amplitude is modulated. For digitalized image data, a software processing by the computer can realize the contour compensation and edge stressing which are equivalent to the present invention, and this invention can be applied to image data processing by the software. Furthermore, this invention has effects to improve the waveform deterioration in the general digital transmission and communication system.

Figure 8:
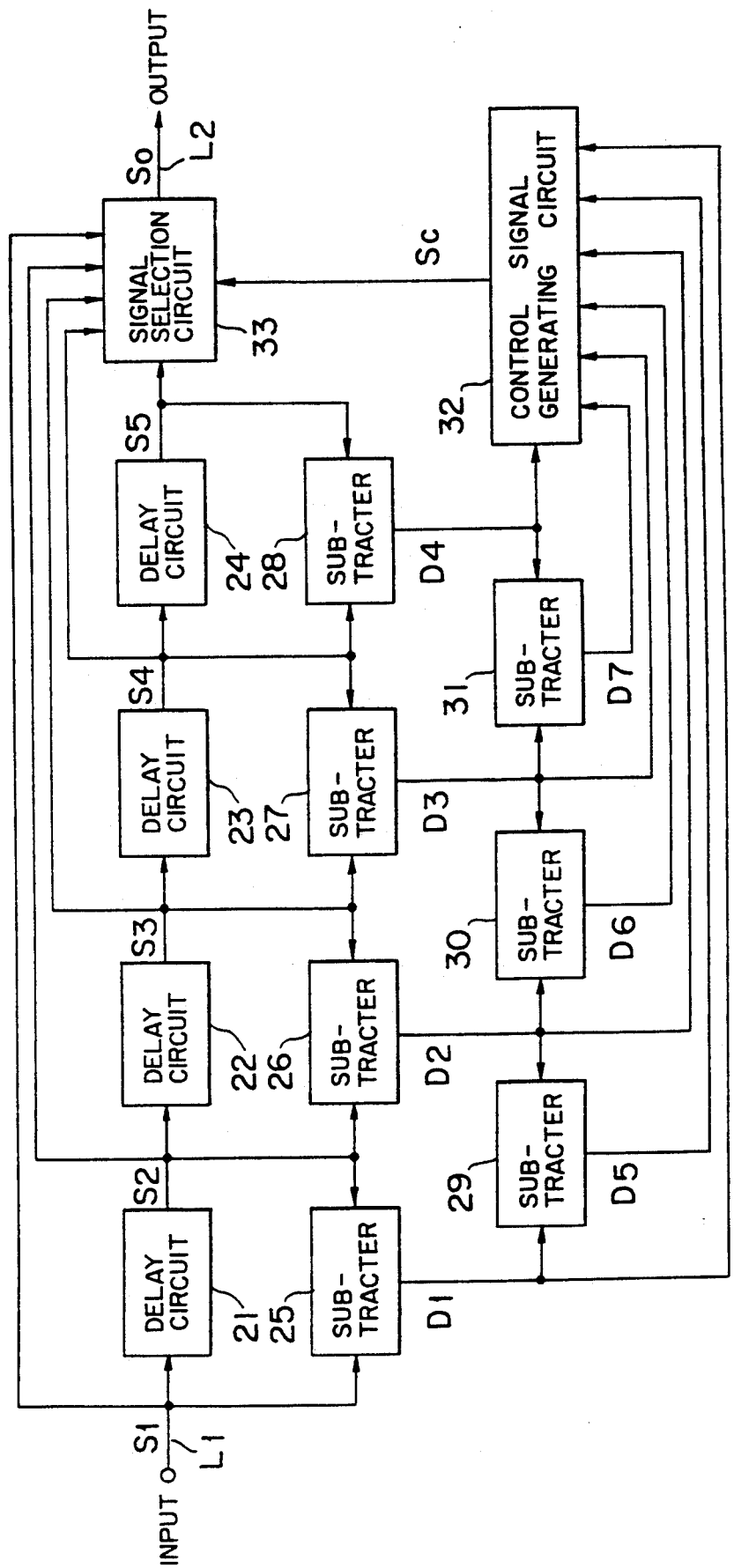
FIG. 8 is a block diagram showing a schematic configuration of a picture quality improving apparatus according to a third embodiment of the present invention.

Next, there is described a third embodiment shown in FIG. 8. Numerals 21 to 24 denote delay circuits having the same delay time, 25 to 31 denote subtracters, 32 denotes a control signal generating circuit, and 33 denotes a signal selection circuit.

For the sake of convenience in a description, there is omitted a signal delay which is caused by the processing time of each circuit and a delay circuit or the like which is used only for compensating the signal delay. Furthermore, an input signal dealt in this picture quality improving apparatus assumes the signal that is a signal modulated in amplitude such as chrominance signals in television signals and the like.

Figure 9:
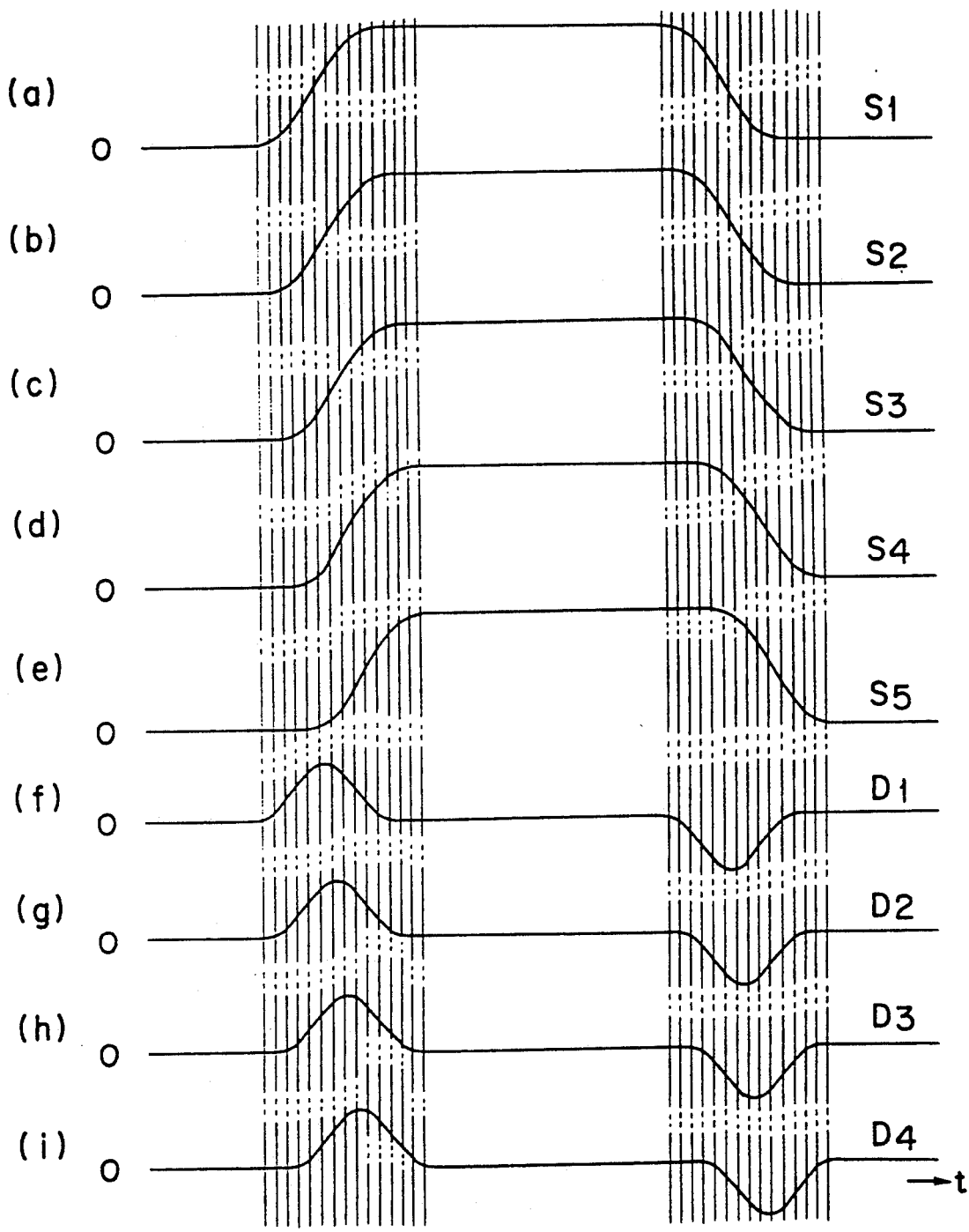
FIGS. 9(a) to 9(r) are characteristic diagrams respectively showing signal timings of each portion of the apparatus shown in FIG. 8.
Figure 9:
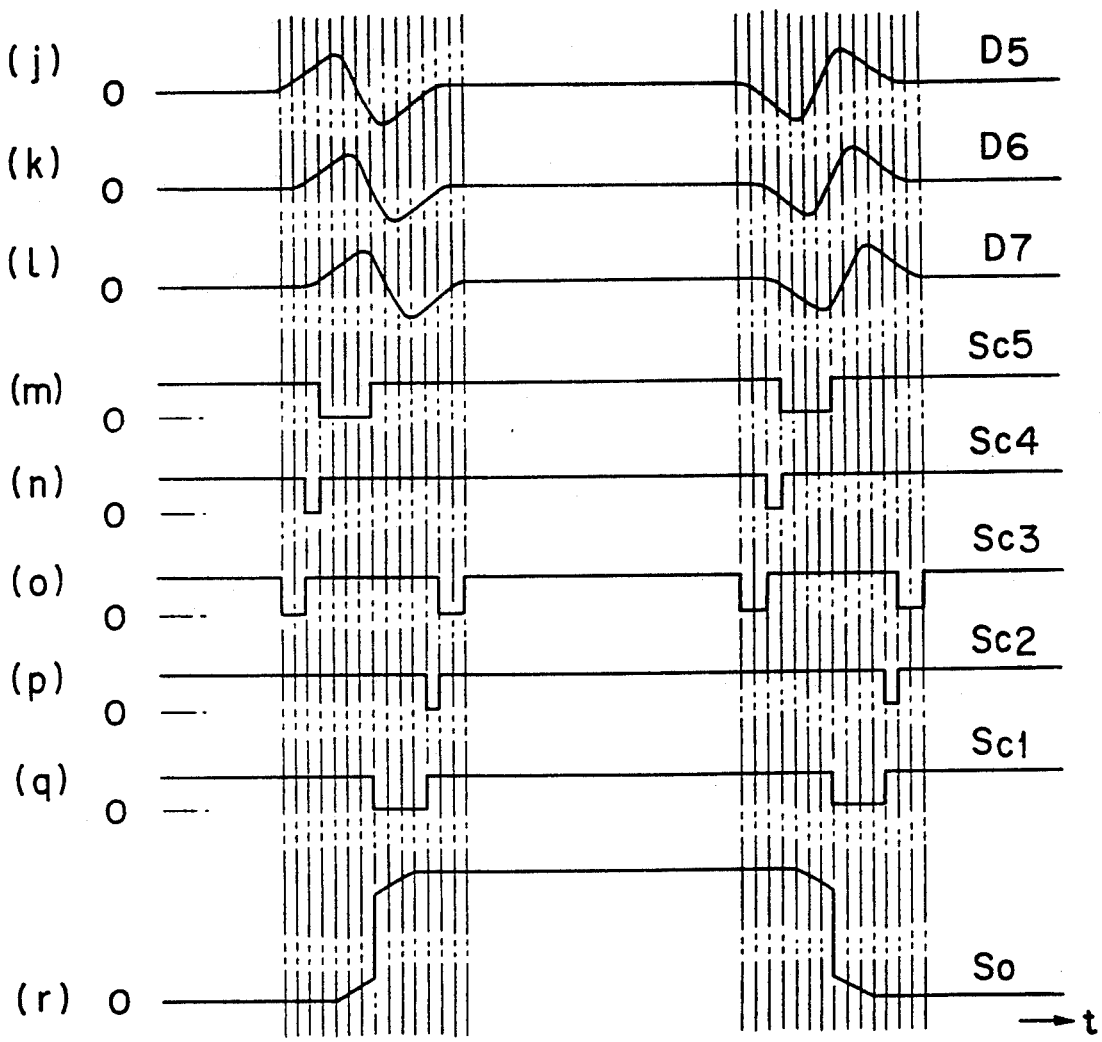

It is supposed that there is an input signal S1 as a luminance signal of the television signals shown in FIG. 9(a) through a line L1. This signal is an example of a luminance signal in the NTSC system having a band of 4 MHz.

The input signal S1 is supplied to the delay circuit 21 with a delay time T which is obtained by an equation (21) as follows:

$$T = 1/(8fsc) = 34.9 \text{ ns} \qquad (21)$$

where Fsc is about 3.58 MHz.

A value of the delay time T corresponds to $\frac{1}{8}$ cycle of the chrominance subcarrier wave (its frequency is Fsc). Furthermore, the value of T is $\frac{1}{2}$ of the ordinary sampling period $\{1/(4fsc)\}$ which is used in the quantization of the television signal.

FIG. 9(b) shows the output signal S2 which is delayed time T by the delay circuit 21. The delay circuit 22 of the next step has the same function as circuit 21 and outputs the signal S3 which is shown in FIG. 9(c) and further delayed time T from the supplied signal S2.

The delay circuit 23 of the next step has the same function as the circuit 21 and outputs the signal S4 which is shown in FIG. 9(d) and further delayed time T from the supplied signal S3.

The delay circuit 24 of the next step has the same function as the circuit 21 and outputs the signal S5 which is shown in FIG. 9(e) and further delayed time T from the supplied signal S4.

These signals S1–S5 form a first signal group.

The subtracter 25 subtracts the output signal S2 of the delay circuit 21 from the input signal S1 and outputs a signal D1 which is obtained by an equation (22). There is a time difference T between the signals S1 and S2 which are adjacent in time axis in the first signal group.

$$D1 = S1 - S2 \qquad (22)$$

The subtracter 26 has the same function as subtracter 25 and subtracts the output signal S3 of the delay circuit 22 from the output signal S2 of the delay circuit 21 to output a signal D2 which is obtained by an equation (23).

$$D2 = S2 - S3 \qquad (23)$$

The subtracter 27 has the same function as subtracter 25 and subtracts the output signal S4 of the delay circuit 23 from the output signal S3 of the delay circuit 22 to output a signal D3 which is obtained by an equation (24).

$$D3 = S3 - S4 \qquad (24)$$

The subtracter 28 has the same function as subtracter 25 and subtracts the output signal S5 of the delay circuit 24 from the output signal S4 of the delay circuit 23 to output a signal D4 which is obtained by an equation (25).

$$D4 = S4 - S5 \qquad (25)$$

These signals D1, D2, D3 and D4 respectively represent a first difference signal and form a first difference signal group. And the subtracters 25–28 form a first subtracter group.

The subtracter 29 has the same function as subtracter 25 and subtracts the output signal D2 of the subtracter 26 from the output signal D1 of the subtracter 25 to output a signal D5 which is obtained by an equation (26).

$$D5 = D1 - D2 \qquad (26)$$

The subtracter 30 has the same function as subtracter 25 and subtracts the output signal D3 of the subtracter 27 from the output signal D2 of the subtracter 26 to output a signal D6 which is obtained by an equation (27).

$$D6 = D2 - D3 \qquad (27)$$

The subtracter 31 has the same function as subtracter 25 and subtracts the output signal D4 of the subtracter 28 from the output signal D3 of the subtracter 27 to output a signal D7 which is obtained by an equation (28).

$$D7 = D3 - D4 \qquad (28)$$

These signals D5, D6, and D7 respectively represent a second difference signal and form a second difference signal group. And the subtracters 29–31 form a second subtracter group.

FIGS. 9(f) to 9(l) show waveforms of signals D1, D2, D3, D4, D5, D6 and D7. A frequency characteristic g1 of a first differential operation of the first subtracter group (the subtracters 25–28) except phase items is represented as a differential characteristic of the sine waveform, which is obtained by an equation (29). A frequency characteristic g2 of a second differential operation of the second subtracter group (the subtracters 29–31) except phase items is represented as a differential characteristic of the sine waveform in a high-pass filter, which is obtained by an equation (30). The first difference signal corresponds to a simple differential signal, and the second difference signal corresponds to a quadric differential signal. The characteristics of these waveforms of the difference signals are to obtain a significant value at the change portion in the waveform of the input signal.

$$g1 = j2 \sin \{\pi f/(8fsc)\} \quad (29)$$

$$g2 = -2[1 - \cos \{\pi f/(4fsc)\}] \quad (30)$$

The output signals D1 to D7 of the subtracters 25 to 31 are supplied to the control signal generating circuit 32 of the next step. The circuit 32 generates the control signal Sc corresponding to the input signals D1 to D7. The control signal Sc is a logic signal of a low active (negative logic) comprising five signals Sc1, Sc2, Sc3, Sc4 and Sc5 which are shown in FIGS. 9(q), 9(p), 9(o), 9(n) and 9(m) and obtained by an equation (31) as follows:

$$\begin{aligned}
Sc1 = 0 &\ldots D1 > 0, D2 > 0, D3 > 0, D5 < 0 \text{ and } D6 < 0 \text{ or} \\
& D1 < 0, D2 < 0, D3 < 0, D5 > 0 \text{ and } D6 > 0 \\
Sc1 = 1 &\ldots \text{the condition except above} \\
Sc2 = 0 &\ldots D1 > 0, D2 > 0, \text{ and } D6 < 0 \text{ or} \\
& D2 < 0, D3 < 0, \text{ and } D6 > 0 \text{ and } Sc1 = 1 \\
Sc2 = 1 &\ldots \text{the condition except above}
\end{aligned} \quad (31)$$

$$\begin{aligned}
Sc3 = 0 &\ldots Sc1 = Sc2 = Sc4 = Sc5 = 1 \\
Sc3 = 1 &\ldots \text{the condition except above} \\
Sc4 = 0 &\ldots D2 > 0, D3 > 0, \text{ and } D6 < 0 \text{ or} \\
& D2 < 0, D3 < 0, \text{ and } D6 < 0 \text{ and } Sc5 = 1 \\
Sc4 = 1 &\ldots \text{the condition except above} \\
Sc5 = 0 &\ldots D2 > 0, D3 > 0, D4 > 0, D6 > 0 \text{ and } D7 > 0 \text{ or} \\
& D2 < 0, D3 < 0, D4 < 0, D6 < 0 \text{ and } D7 < 0 \\
Sc5 = 1 &\ldots \text{the condition except above}
\end{aligned}$$

As described above, the conditions are as follows:

(i) when a first condition is satisfied in that values of the signals D2, D3, D4, D6 and D7 all have the same positive or negative polarity, the signal Sc5 is "0" (Low);

(ii) when values of the signals D2, D3 and D6 all have the same positive or negative polarity and the first condition is not satisfied, the signal Sc4 is "0" (Low);

(iii) when a second condition is satisfied in that values of the signals D1, D2 and D3 all have the same positive or negative polarity, values of the signals D5 and D6 all have the same positive or negative polarity, and the values of the signals D5 and D6 have the polarity different from the signals D1, D2 and D3, the signal Sc1 is "0" (Low);

(iv) when the values of the signals D2 and D3 all have the same positive or negative polarity, the value of the signal D6 has the polarity different from the signals D2 and D3, and the second condition is not satisfied, the signal Sc2 is "0" (Low); and (v) when the combinations of values of the signals D1 to D7 meet none the above conditions, the signal Sc3 is "0" (Low).

Figure 10:
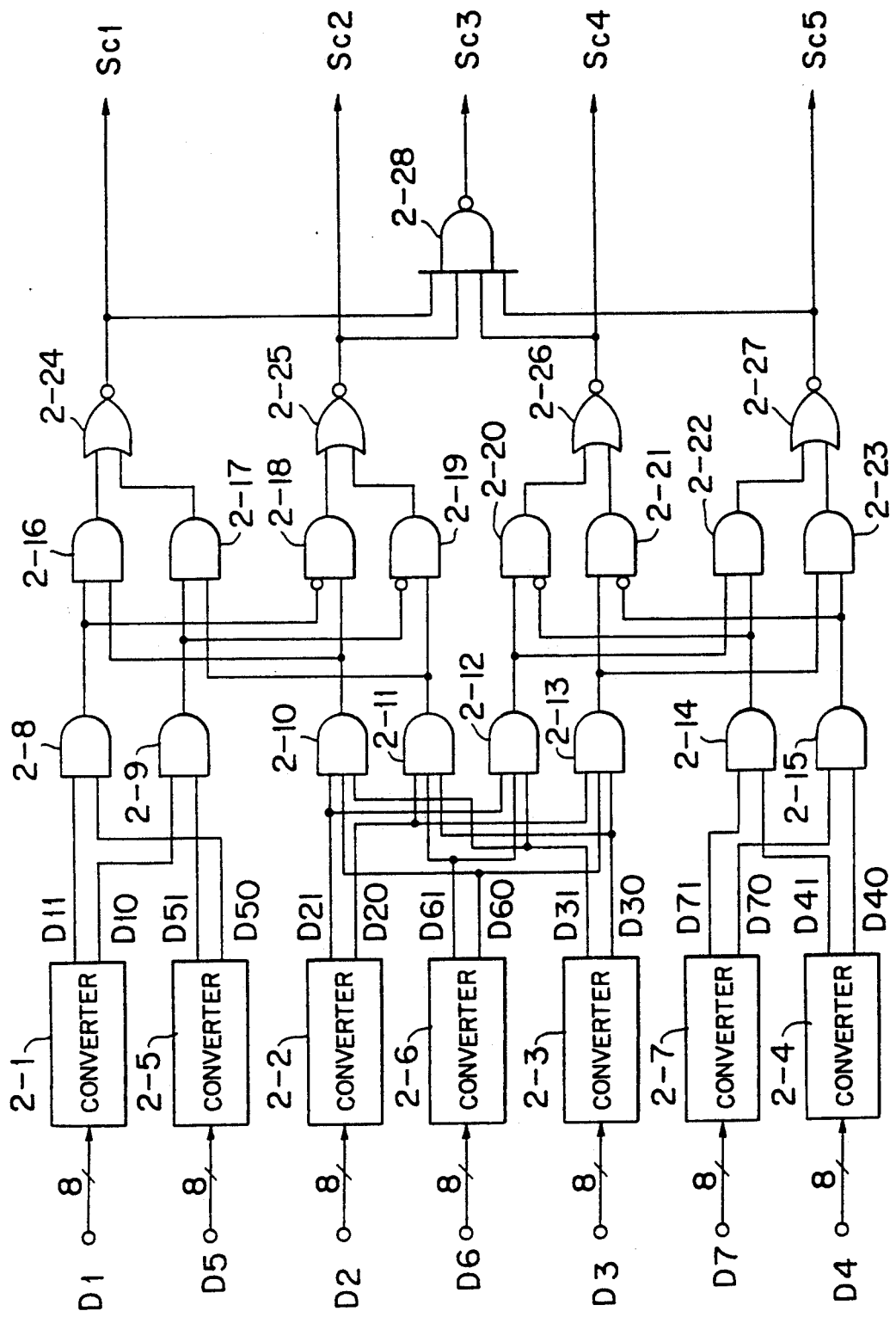
FIG. 10 is a circuit diagram showing a specific example of a control signal generating circuit in the apparatus shown in FIG. 8.

FIG. 10 shows a circuit example for realizing the control signal generating circuit 32.

In FIG. 10, converters 2-1 to 2-7 output 2-bit signals after converting the signals D1–D7 into "10" when they are positive, "00" when they are zero, and "01" when they are negative. A Table 5 shows a conversion table of each converter, and signals D1 to D7 in 2-bit form are represented in an equation (32) as follows:

TABLE 5

|  | Dn1 | Dn0 |
|---|---|---|
| Dn > 0 | 1 | 0 |
| Dn = 0 | 0 | 0 |
| Dn < 0 | 0 | 1 | where n = 1–7.

$$Dn = 2^0 Dn1 + 2^{-1} Dn0 \quad (32)$$

where n = 1–7.

The converters 2-1 to 2-7 are comprised of a table look-up system such as TTL-IC and ROM and a PLA (programmable logic array).

Outputs of the seven converters pass through AND circuits 2-8 to 2-23, NOR circuits 2-24 to 2-27, and a NAND circuit 2-28 so as to output the control signals Sc1, Sc2, Sc3, Sc4 and Sc5 obtained by an equation as follows:

$$\begin{aligned}
\overline{Sc1} &= \overline{D11 \times D50 \times D21 \times D60 \times D31} + \overline{D10 \times D51 \times D20 \times D61 \times 30} \\
\overline{Sc2} &= \overline{D11 \times D50 \times D21 \times D60 \times D31} + \overline{D10 \times D51 \times D20 \times D61 \times 30} \\
Sc3 &= Sc1 + Sc2 + Sc4 + Sc5 \\
\overline{Sc4} &= \overline{D71 \times D41 \times D21 \times D61 \times D31} + \overline{D70 \times D40 \times D20 \times D60 \times 30} \\
\overline{Sc5} &= \overline{D71 \times D41 \times D21 \times D61 \times D31} + \overline{D70 \times D40 \times D20 \times D60 \times 30}
\end{aligned} \quad (33)$$

Even though the signals Sc1 to Sc5 are represented simply by name in FIG. 10, in the above equation, the signals are represented by logical equations of the low active type (negative logic), namely, adding bars in order to clarify intended use of these signals.

Since the signals D1 to D7 are the output signals of the subtracters having the function of the high-pass filter, it is generally possible to include noise components of the high frequency wave. In order to improve performance of the control signal generating circuit 32 to the noise component, reference values in the converters 2-1 to 2-7 are set as a small positive value $\beta$ (a value corresponding to a level of high frequency noise components) not to "0". The converters 2-1 to 2-7 respectively output 2-bit signals of the signals D1 to D7 which have value "10" when the reference value is over $\beta$, "00" when the value is on or between $-\beta$ and $\beta$, and "01" when the value is under $-\beta$. Setting the reference value causes the control signal generating circuit 32 to improve performance to noises. The reference values $\beta$ may be set at different values for each converter.

Here, the description returns to FIG. 8 and the signals S1, S2, S3, S4 and S5 and the control signal Sc (signals Sc1, Sc2, Sc3, Sc4 and Sc5) are supplied to the signal selection circuit 33 of the next step. The signal selection circuit 33 outputs any one of the signals S1 to S5 corresponding to the control signal Sc to output a signal So obtained by an equation (34) as follows:

$$So = Sn \quad (34)$$

(when Scn = 0 where n = 1, ... 5).

Namely, the signal selection circuit 33 selects and outputs signal S1 when the control signal Sc1 is "0"

(Low), the signal S2 when the control signal Sc2 is "0" (Low), the signal S3 when the control signal Sc3 is "0" (Low), the signal S4 when the control signal Sc4 is "0" (Low), and the signal S5 when the control signal Sc5 is "0" (Low).

Figure 11A:
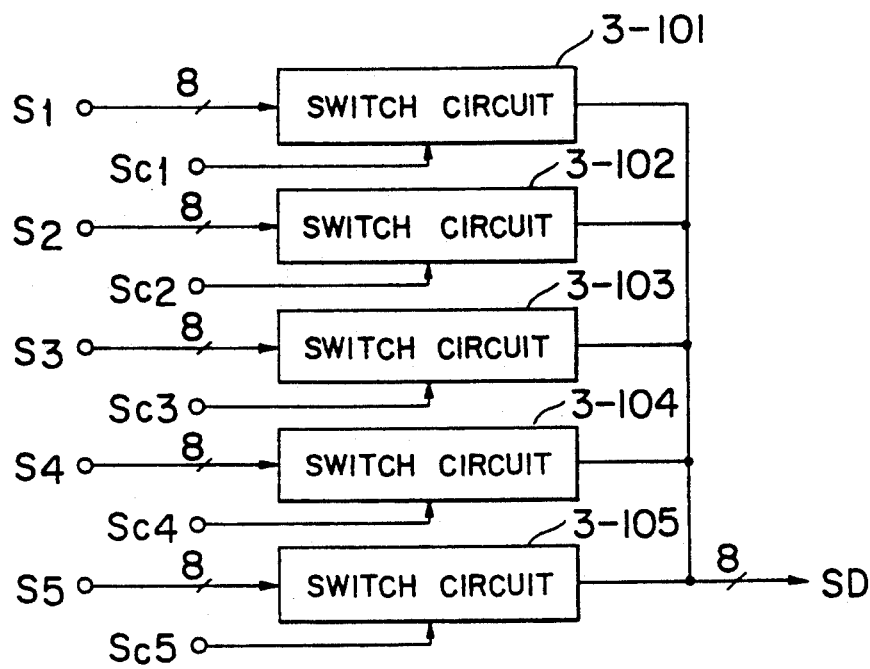
FIGS. 11A and 11B are circuit diagrams each showing a specific example of a signal selection circuit of the apparatus shown in FIG. 8.

FIG. 11A shows a circuit example for realizing the signal selection circuit 33. Numerals 3-101 to 3-105 denote switch circuits to which the signals S1 to S5 and the control signals Sc1 to Sc5 are respectively supplied. When any one of the control signals Sc1 to Sc5 is "0" (Low), the switch circuit to which the control signal is supplied, is turned on so as to output any one of the signals S1 to S5 through the shared output terminal.

Figure 11B:
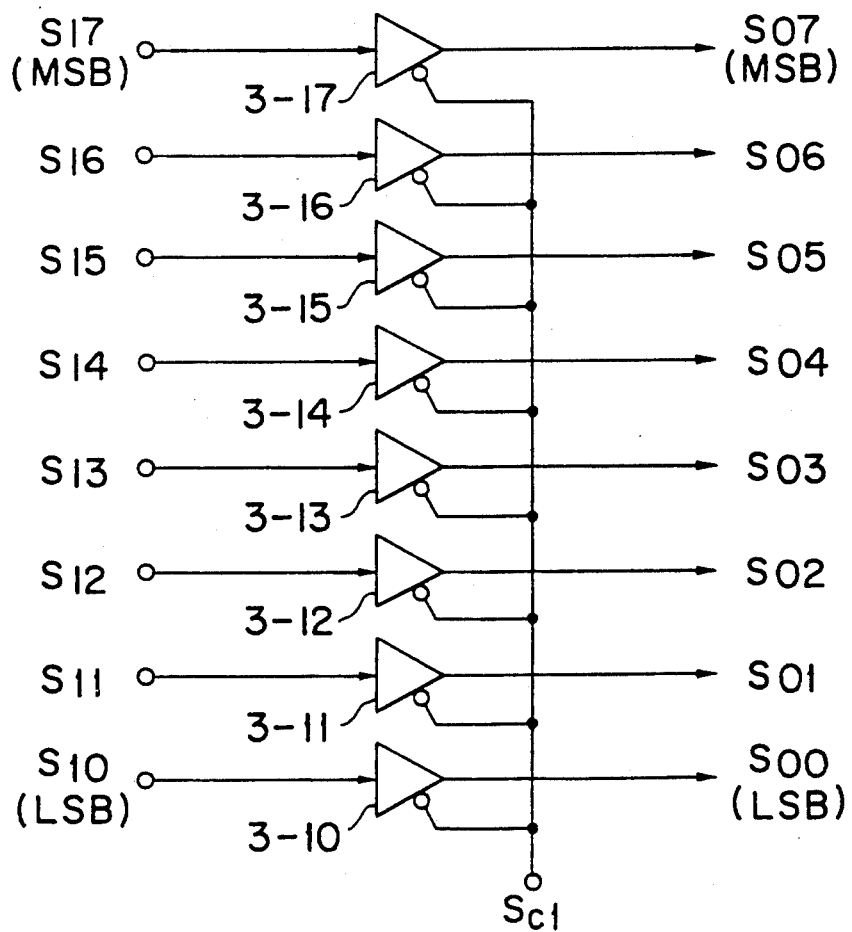

The switch circuits 3-101 to 3-105 have the same configuration as each other. FIG. 11B shows the specific circuit example of the switch circuit 3-101 as the representative of the switch circuits 3-101 to 3-105. The signals Si and So have 8 bits which represents the complement of "2". In FIG. 11B, blocks 3-10 to 3-17 denote buffer circuits each having a control terminal and a shared control terminal which receives the control signal Sc1. When the control signal Sc1 is "0" (Low), the input signal Si that is signals Si0 (LSB) to Si7 (MSB) is outputted as it is, namely, as the output So {that is So0 (LSB) to So7 (MSB)}. When the control signal Sc1 is "1" (High), an output is a tri-state or a high impedance condition.

The output signal So which is obtained by the above steps and also is an output of the picture quality improving apparatus, is shown as the waveform of FIG. 9(r).

When the output signal So is compared with the input signal S1 shown in FIG. 9(a), the signal So has is a waveform step is added to a substantial midpoint of the waveform change (edge) portion of the envelope of the input waveform of the signal S1, the waveform change of the envelope is shaped sharply, and the edge is properly stressed. If a output signal So is reproduced, there can be obtained the reproduced picture in which the contour is compensated and the color blur improved.

Furthermore, in the picture quality improving apparatus, edge stressing is performed within an amplitude of the original signal and is not over the amplitude of the original signal such as the preshoot and the overshoot which occur in the conventional contour compensation, as understood from the output waveform So shown in FIG. 9(r). Accordingly, in the case that the apparatus and devices including this picture quality improving apparatus are comprised of digital circuit, the problem of overflow does not occur and the apparatus and devices perform an extreme improvement for a picture quality.

As described above, since the edge stressing prevents the reproduced picture image from having preshoot and overshoot, a the reproduced picture is obtained which a watching person senses to be intact and without incongruity. Accordingly, the picture signal So outputted from the line L2 is stressed by the edge, there is the signal to which a spectrum over the original band of the signal S1 is newly added. The new addition of the spectrum gives a person watching the reproduced picture image an impression that the resolution of the original signal is improved and this additional spectrum provides an improvement in picture distinction.

Here, the sharpness of the change portion of the envelope (degrees of the edge stressing) of the output signal So depends on the frequency characteristics within the change portion of the envelope in the original signal S1 before stressing the edge. If the leading and trailing edge portions of the envelope of the original signal S1 have sharper slants, edge stressing is performed to a stronger degree, but to a weaker degree for gentler slants.

As described above, since the degree of edge stressing depends on the frequency of the input signal and has a complete correlation with the input signal, this picture quality improving apparatus does not give a person watching the reproduced picture a sense of incongruity and he senses intact pictures, thereby improving a distinction and a resolution of the picture image.

Furthermore, as each component of the shown embodiments is comprised itself of simple and generally available circuitry, for example, IC and the like which are available on the market, it is possible to manufacture the entire apparatus and devices at low cost.

Figure 12:
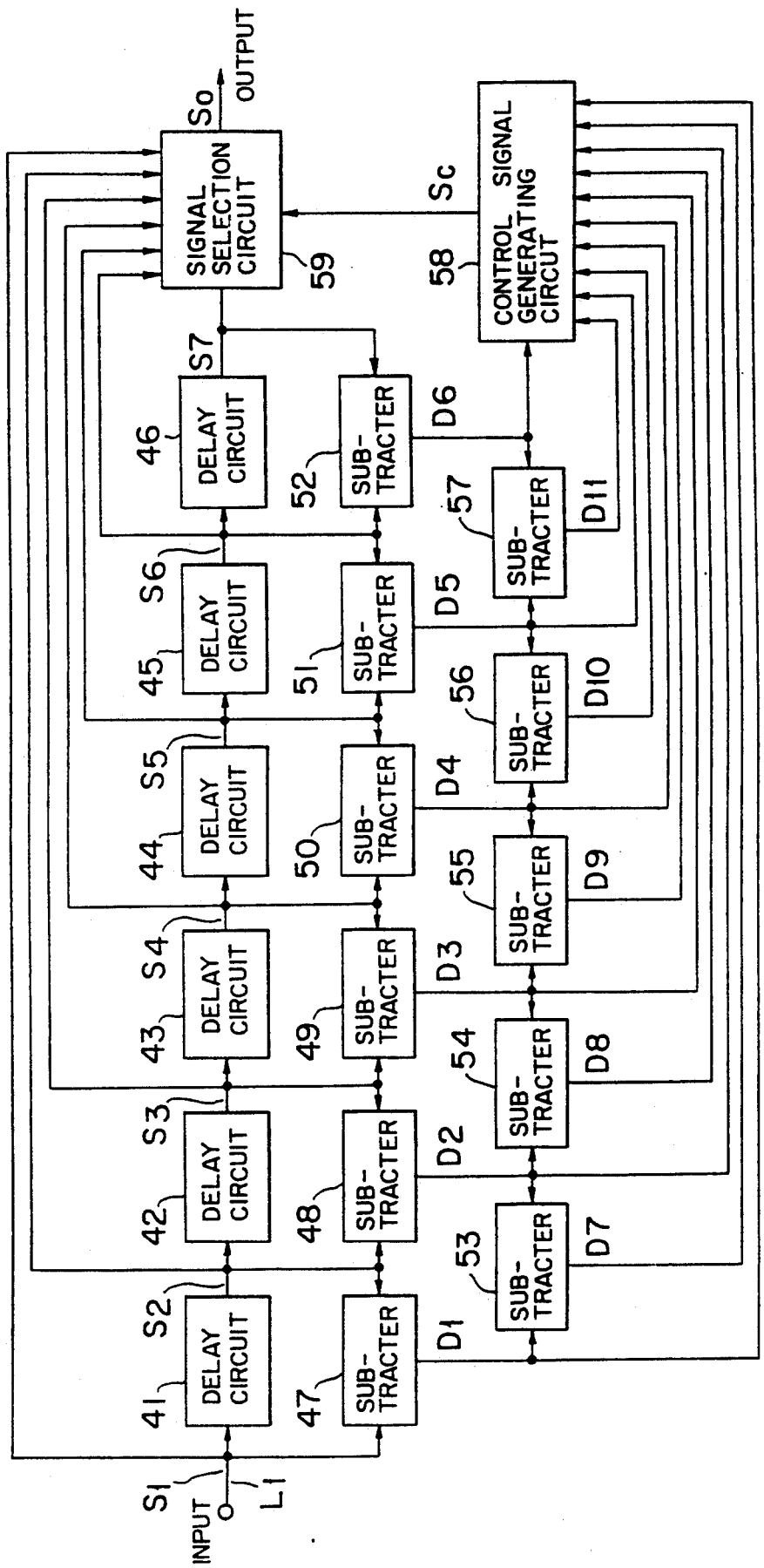
FIG. 12 is a block diagram showing a schematic configuration of a picture quality improving apparatus according to a fourth embodiment of the present invention.

Next, FIG. 12 shows a picture quality improving apparatus according to a fourth embodiment. Numerals 41 to 46 denote delay circuits having the same delay time, 47 to 57 denote subtracters, 58 denotes a control signal generating circuit, and 59 denotes a signal selection circuit. In the fourth embodiment, the entire configuration is substantially the same as the third embodiment shown in FIG. 8.

The difference between the third and fourth embodiments resides in the number of delay circuits. Even though the number of the delay circuits 41 to 46 is even, the delay circuits 45 and 46 are added to the configuration of the third embodiment in the fourth embodiment. The first subtracter group also has the subtracters 47 to 52 two more than the third embodiment, which are even numbers. Also, the second subtracter group has the subtracters 53 to 57 two more than the third embodiment, which are odd numbers.

Figure 13:
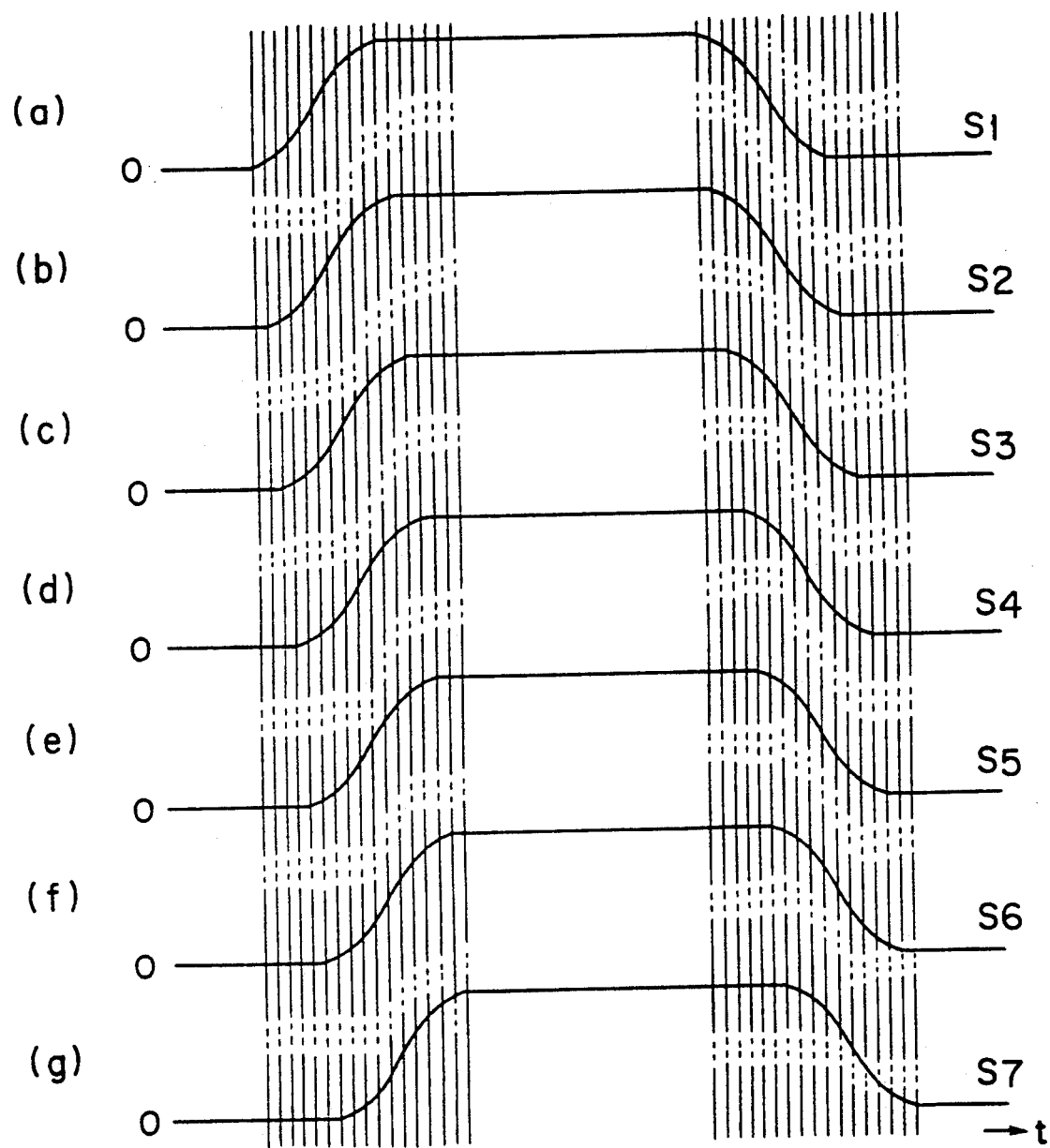
FIGS. 13(a) to 13(z) are characteristic diagrams respectively showing signal timings of each portion of the apparatus shown in FIG. 12.
Figure 13:
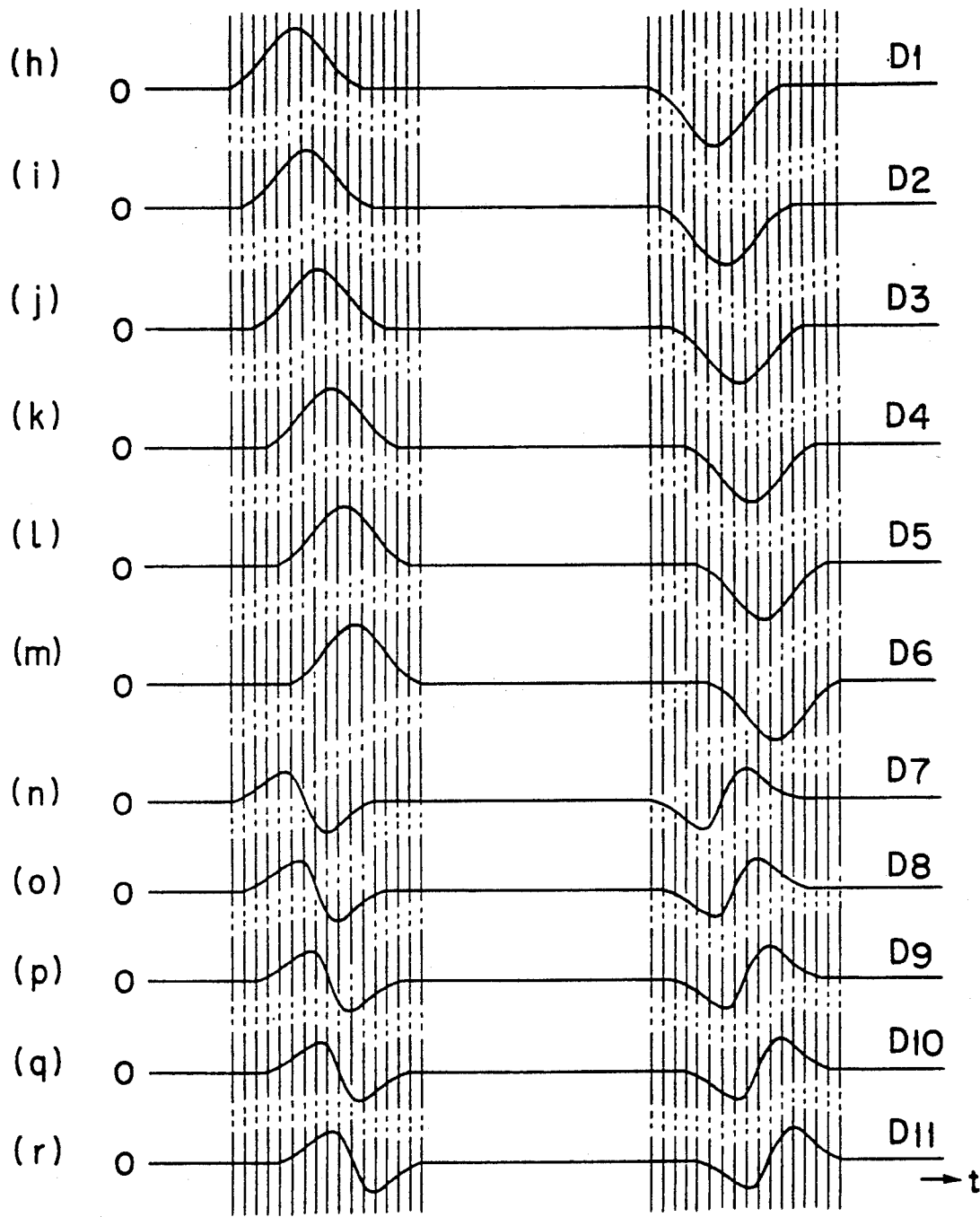
Figure 13:
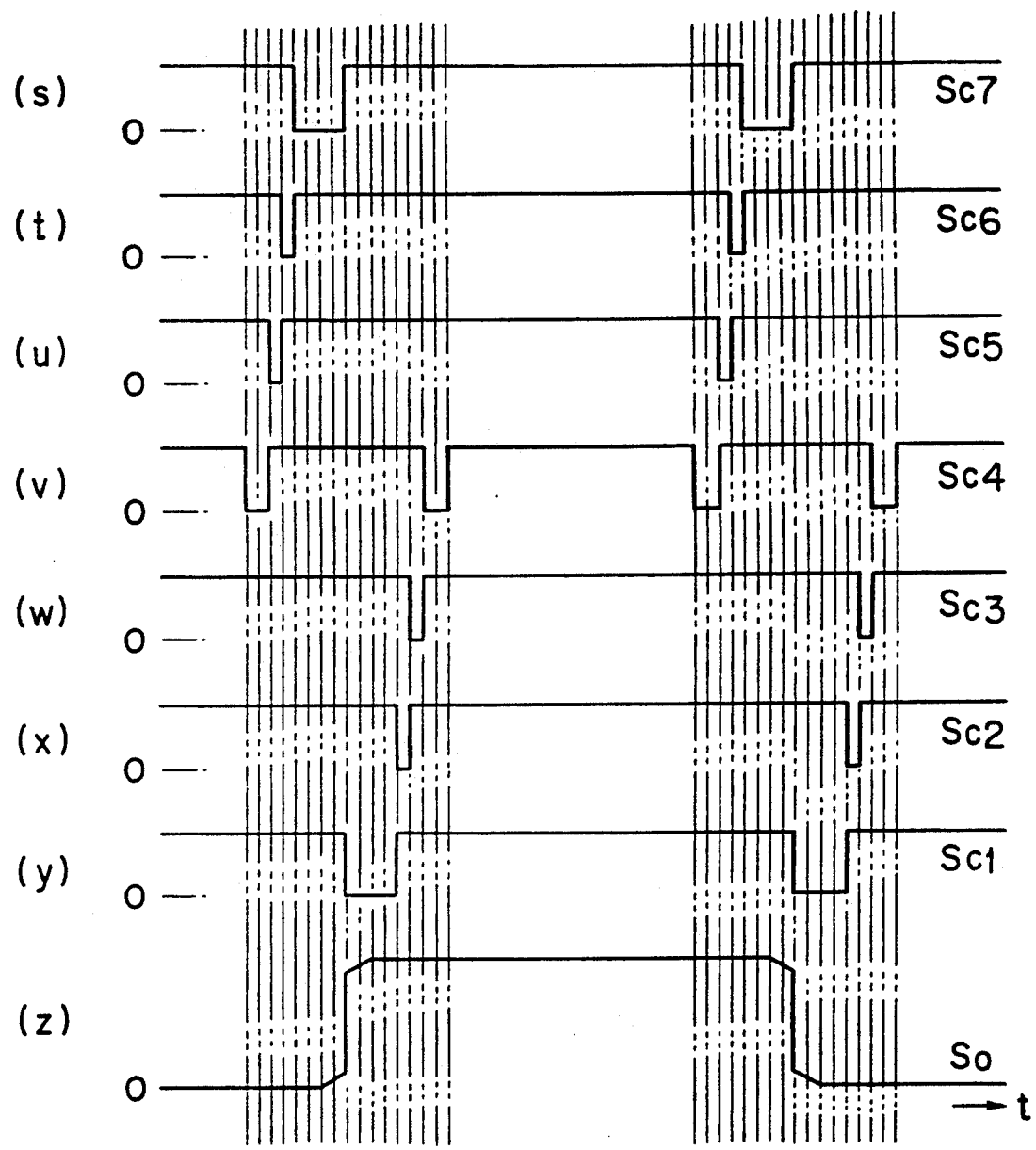

In the fourth embodiment, when the input signal S1 is a signal which is shown in FIG. 13(a), and the delay times of the delay circuits 41–46 are given by the equation (21), FIGS. 13(b) to 13(g) show waveforms of the signals S2 to S7 which are delayed step by step time T.

The subtracters 47 to 52 respectively perform the first difference operation by using the signals S1 to S7 of the delay circuits 41 to 46 which respectively have the time difference T, thereby outputting the signals D1 to D6 obtained by an equation (35) as follows:

$$\left.\begin{array}{l}D1 = S1 - S2\\D2 = S2 - S3\\D3 = S3 - S4\\D4 = S4 - S5\\D5 = S5 - S6\\D6 = S6 - S7\end{array}\right\} \quad (35)$$

FIGS. 13(h) to 13(m) show the waveforms of the signals D1 to D6.

The subtracters 53 to 57 respectively performs the second difference operation, thereby outputting the signals D7 to D11 obtained by an equation (36) as follows:

$$\left.\begin{array}{l}D7 = D1 - D2\\D8 = D2 - D3\\D9 = D3 - D4\\D10 = D4 - D5\\D11 = D5 - D6\end{array}\right\} \quad (36)$$

FIGS. 13(n) to 13(r) show the waveforms of the signals D7 to D11.

The first difference signals D1, D2, D3, D4, D5 and D6 and the second difference signals D7, D8, D9, D10 and D11 are supplied to the control signal generating circuit 58 of the next step. The circuit 58 generates the control signal Sc (that is, Sc1, Sc2, Sc3, Sc4, Sc5, Sc6 and Sc7) corresponding to the combinations of the value of each signal. The condition of each signal is represented by an equation (37) as follows:

$$
\begin{aligned}
Sc1 = 0 &\ldots\ D1 > 0, D2 > 0, D3 > 0, D4 > 0, D7 < 0, D8 < 0 \text{ and } D9 < 0 \text{ or} \\
&\ \ \ \ \ D1 < 0, D2 < 0, D3 < 0, D4 < 0, D7 > 0, D8 > 0 \text{ and } D9 > 0 \\
Sc1 = 1 &\ldots\ \text{the condition except above} \\
Sc2 = 0 &\ldots\ D2 > 0, D3 > 0, D4 > 0, D8 < 0 \text{ and } D9 < 0 \text{ or} \\
&\ \ \ \ \ D2 < 0, D3 < 0, D4 < 0, D8 > 0 \text{ and } D9 > 0 \text{ and } Sc1 = 1 \\
Sc2 = 1 &\ldots\ \text{the condition except above} \\
Sc3 = 0 &\ldots\ D3 > 0, D4 > 0, \text{ and } D9 < 0 \text{ or } D3 < 0, D4 < 0 \text{ and } D9 > 0 \text{ and } Sc1 = Sc2 = 1 \\
Sc3 = 1 &\ldots\ \text{the condition except above} \\
Sc4 = 0 &\ldots\ Sc1 = Sc2 = Sc3 = Sc5 = Sc6 = Sc7 = 1 \\
Sc4 = 1 &\ldots\ \text{the condition except above} \\
Sc5 = 0 &\ldots\ D3 > 0, D4 > 0, \text{ and } D9 > 0 \text{ or } D3 < 0, D4 < 0, \text{ and } D9 < 0 \text{ and } Sc7 = Sc6 \\
Sc5 = 1 &\ldots\ \text{the condition except above} \\
Sc6 = 0 &\ldots\ D3 > 0, D4 > 0, D5 > 0, D9 > 0, \text{ and } D10 > 0 \text{ or} \\
&\ \ \ \ \ D3 < 0, D4 < 0, D5 < 0, D9 < 0 \text{ and } D10 < 0 \text{ and } Sc7 = 1 \\
Sc6 = 1 &\ldots\ \text{the condition except above} \\
Sc7 = 0 &\ldots\ D3 > 0, D4 > 0, D5 > 0, D6 > 0, D9 > 0, D10 > 0 \text{ and } D11 > 0 \text{ or} \\
&\ \ \ \ \ D3 < 0, D4 < 0, D5 < 0, D6 < 0, D9 < 0, D10 < 0 \text{ and } D11 < 0 \\
Sc7 = 1 &\ldots\ \text{the condition except above}
\end{aligned}
\tag{37}
$$

FIGS. 13(s) to 13(y) show the waveforms of the control signals Sc7 to Sc1.

As described in the third embodiment shown in FIG. 8, in order to improve the performance for suppressing noises of the control signal generating circuit 58, the converters in the circuit 58 may have the reference value $\beta$ for removing noises, thereby distributing the signals D1 to D11.

The signals S1 to S7 and the control signal Sc (that is, Sc1 to Sc7) are supplied to the signal selection circuit 59 which selects signal Sn (n=1-7) corresponding to the condition that any one of the seven control signals Scn (n=1-7) becomes low "0", thereby outputting the signal So shown in FIG. 13(z). The sharpness of the waveform edge of the signal So obtained in the fourth embodiment, is sharper than that of the third embodiment shown in FIG. 9(r).

By this, it can be understood that the increase of the number of the delay circuits can increase an amount of edge stressing. Accordingly, increasing and decreasing the numbers of the delay circuits can make the picture quality improving apparatus regulate the amount of edge stressing.

The fourth embodiment has also and of course the same effect as the third embodiment except above.

It is easy to generalize the method for increasing and decreasing the numbers of the above delay circuits. Namely, the picture quality improving apparatus comprises delay circuits of an even number (2M, where M is an integral number more than two) which are connected in series and gives in turn an input signal a predetermined delay time;

a first signal group of an odd number (2M plus 1) including the input signal and an even number (2M) of output signals of the delay circuit;

a first subtracter group which is formed by connecting an even number (2M) of subtracters for each obtaining a first differential signal by calculating a difference between two signals in time adjacent in the first signal group;

a first differential signal group including the even number (2M) of the first differential signals which are obtained by the first subtracter group;

a second subtracter group which is formed by connecting an odd number (2M−1) of subtracters for each obtaining a second differential signal by calculating a difference between two signals in time adjacent in the first differential signal group;

a second differential signal group including the even number (2M) of the second differential signals which are obtained by the second subtracter group;

a control signal generating circuit for obtaining a control signal which changes its value corresponding to combinations of the first and second differential signals in the first and second differential signal groups;

a signal selection circuit which is supplied the first signal group and control signal for selecting and outputting anyone signal amongst the first signal group corresponding to the control signal in the manner of obtaining an output signal which is generated by adding a waveform step to a midpoint portion of a waveform change of the input signal.

Accordingly, the apparatus obtains an output signal stressed by an edge of an input signal.

Even though the above embodiments use the luminance signals of the television signals as the input signal, the picture quality improving apparatus of the present invention can process other signals in which the amplitude is modulated. For digitalized image data, a software processing by the computer can realize the contour compensation and edge stressing which are equivalent to the present invention, and this invention can be applied to image data processing by the software. Furthermore, this invention has the effect of improving waveform deterioration in the general digital transmission and communication system.

What is claimed is:

1. An image improvement apparatus including:
   when input signals which are amplitude modulated by a modulating wave are first signals,
   a delay circuit which outputs second signals which are said first signals which have been time delayed by an integral multiple of a cycle of said modulation wave, and third signals which are said second signals which have been time delayed by said positive integral multiple, a first subtracter which subtracts said second signals from said first signals and outputs fourth signals, a second subtracter which subtracts said third signals from said second signals and outputs fifth signals, a third subtracter which subtracts said fifth signals from said fourth signals and outputs sixth signals, a control signal generating circuit which is supplied with said fourth, fifth and sixth signals, and outputs a seventh signal which is a control signal for which the value changes in accordance with combinations of said fourth, fifth and sixth signals, a composite circuit supplied with said first, second and third signals, and which combines said first signals and said second signals and outputs an eighth signal, and combines said second and third signal and outputs a ninth signal, and a signal selection circuit supplied with said eighth, second, ninth and seventh signals, and which selects and outputs one of said eighth, second and ninth signals in accordance with said seventh signal which is a control signal, said control signal generating circuit outputs (a) a control signal for said signal selection circuit select and output said ninth signal when a value of the three signals of said fourth, fifth and sixth signals all have the same polarity when they are positive or negative at the same time, (b) a control signal for said signal selection circuit to select and output said eighth signal when a value of the three signals of said fourth, fifth and sixth signals all have the same polarity when they are positive or negative at the same time, and when a value of said sixth signal is a value of a different polarity to the polarity of a value of said fourth and fifth signals, and (c) a control signal for said signal selection circuit to select and output said second signal when a combination of the thee signals of said fourth, fifth and sixth signals is other than a combination of (a) and (b), and wherein an output signal for which an edge of an envelope of first signals which are said input signals is emphasized.

2. An image improvement apparatus including:

when input signals which are amplitude modulated by a modulating wave are first signals, a delay circuit which outputs second signals which are said first signals which have been time delayed by an integral multiple of a cycle of said modulation wave, and third signals which are said second signals which have been time delayed by said positive integral multiple, a first adder which adds said second signals to said first signals and outputs fourth signals, a second adder which adds said third signals to said second signals and outputs fifth signals, a third adder which adds said fifth signals to said fourth signals and outputs sixth signals, a control signal generating circuit which is supplied with said fourth, fifth and sixth signals, and outputs a seventh signal which is a control signal for which the value changes in accordance with combinations of said fourth, fifth and sixth signals, a composite circuit supplied with said first, second and third signals, and which combines said first signals and said second signals and outputs an eighth signal, and combines said second and third signal and outputs a ninth signal, and a signal selection circuit supplied with said eighth, second, ninth and seventh signals, and which selects and outputs one of said eighth, second and ninth signals in accordance with said seventh signal which is a control signal, said control signal generating circuit outputs (a) a control signal for said signal selection circuit select and output said ninth signal when a value of the three signals of said fourth, fifth and sixth signals all have the same polarity when they are positive or negative at the same time, (b) a control signal for said signal selection circuit to select and output said eighth signal when a value of the three signals of said fourth, fifth and sixth signals all have the same polarity when they are positive or negative at the same time, and when a value of said sixth signal is a value of a different polarity to the polarity of a value of said fourth and fifth signals, and (c) a control signal for said signal selection circuit to select and output said second signal when a combination of the three signals of said fourth, fifth and sixth signals is other than a combination of (a) and (b), and wherein an output signal for which an edge of an envelope of first signals which are said input signals is emphasized.

3. An image improvement apparatus including:

when input signals which are amplitude modulated by a modulating wave are first signals, a delay circuit which outputs second signals which are said first signals which have been time delayed by an integral multiple of a cycle of said modulation wave, and third signals which are said second signals which have been time delayed by said positive integral multiple, a first subtracter which subtracts said second signals from said first signals and outputs fourth signals, a second subtracter which subtracts said third signals from said second signals and outputs fifth signals, a third subtracter which subtracts said fifth signals from said fourth signals and outputs sixth signals, a control signal generating circuit which is supplied with said fourth, fifth and sixth signals, and outputs a seventh signal which is a control signal for which the value changes in accordance with combinations of said fourth, fifth and sixth signals, a composite circuit supplied with said first, second and third signals, and which combines said first signals and said second signals and outputs an eighth signal, and combines said second and third signal and outputs a ninth signal, and a signal selection circuit supplied with said eighth, second, ninth and seventh signals, and which selects and outputs one of said eighth, second and ninth signals in accordance with said seventh signal which is a control signal, said control signal generating circuit outputs (a) a control signal for said signal selection circuit select and output said ninth signal when values of said fourth and fifth signals are both larger than a first positive constant, and a value of said sixth signal is simultaneously larger than a second positive constant, or when values of said fourth and fifth signals are both smaller than a first negative constant, and a value of said sixth signal is simultaneously smaller than a second negative constant, and (b) a control signal for said signal selection circuit select and output said eighth signal when values of said fourth and fifth signals are both larger than a first positive constant, and a value of said sixth signal is simultaneously smaller than a second negative constant, or when values of said fourth and fifth signals are both smaller than a first negative constant, and a value of said sixth signal is larger than a second positive constant, and (c) a control signal for said signal selection circuit to select and output said second signal when a combination of the three signals of said fourth, fifth and sixth signals is other than a combination of (a) and (b), and wherein an output signal for which an edge of an envelope of first signals which are said input signals is emphasized.

4. An image improvement apparatus including:

when input signals which are amplitude modulated by a modulating wave are first signals, a delay circuit which outputs second signals which are said first signals which have been time delayed by an integral multiple of a cycle of said modulation wave, and third signals which are said second signals which have been time delayed by said positive integral multiple, a first subtracter which subtracts said second signals from said first signals and outputs fourth signals, a second subtracter which subtracts said third signals from said second signals and outputs fifth signals, a third subtracter which subtracts said fifth signals from said fourth signals and outputs sixth signals, a control signal generating circuit which is supplied with said fourth, fifth and sixth signals, and outputs a seventh signal which is a control signal for which the value changes in accordance with combinations of said fourth, fifth and sixth signals, a composite circuit supplied with said first, second and third signals, and which combines said first signals and said second signals and outputs an eighth signal, and combines said second and third signal and outputs a ninth signal, and a signal selection circuit supplied with said eighth, second, ninth and seventh signals, and which selects and outputs one of said eighth, second and ninth signals in accordance with said seventh signal which is a control signal, said control signal generating circuit outputs (a) a control signal for said signal selection circuit select and output said ninth signal when values of said fourth and fifth signals are both smaller than a first positive constant, and a value of said sixth signal is simultaneously smaller than a second positive constant, or when values of said fourth and fifth signals are both larger than a first negative constant, and a value of said sixth signal is simultaneously larger than a second negative constant, and (b) a control signal for said signal selection circuit select and output said eighth signal when values of said fourth and fifth signals are both larger than a first positive constant, and a value of said sixth signal is simultaneously smaller than a second negative constant, or when values of said fourth and fifth signals are both smaller than a first negative constant, and a value of said sixth signal is larger than a second positive constant, and (c) a control signal for said signal selection circuit to select and output said second signal when a combination of the three signals of said fourth, fifth and sixth signals is other than a combination of (a) and (b), and wherein an output signal for which an edge of an envelope of first signals which are said input signals is emphasized.

5. An image improvement apparatus, comprising:

an even number (2M where M is an integer greater than 2) of series connected delay circuits which successively give a required time delay with respect to input signals, and wherein a signal group of odd numbers (2M+1) and formed by said input signals and each output signal of an even number (2M) of said delay circuits, is made a first signal group, a first subtracter group in which an even number (2M) of subtracters obtaining first difference signals by determining a difference between two temporarily adjacent signals of said first signal group are connected, wherein a signal group comprising said first difference value signals of even numbers (2M) and obtained from said first subtracter group is made a first difference value signal group, a second subtracter group in which an odd number (2M−1) of subtracters obtaining second difference signals by determining a difference between two temporarily adjacent signals of said first difference value signal group, are connected, wherein a signal group comprising said second difference value signals of odd numbers (2M−1) and obtained from said second subtracter group is made a second first difference value signal group, and a control signal generating circuit obtains control signals which change in accordance with combinations of polarity data addition values of each of said second difference value signals and each of said first difference value signals of said first and second difference value signal groups and a signal selection circuit to which are supplied said first signal group and said control signals, and which in accordance with said control signals, selects one of signals inside said first signal group so that the obtained signals are output signals to which a waveform step difference has been added to a middle position of a waveform change portion of said input signals.

6. An image improvement apparatus including:

a delay circuit which applies a required time delay to first signals which are input signals and outputs second signals, applies a required time delay to said second signals and outputs third signals, applies a required time delay to said third signals and outputs fourth signals, applies a required time delay to said fourth signals and outputs fifth signals, a first subtracter which subtracts said second signals from said first signals and outputs sixth signals, a second subtracter which subtracts said third signals from said second signals and outputs seventh signals, a third subtracter which subtracts said third signals from said fourth signals and outputs eighth signals, a fourth subtracter which subtracts said fourth signals from said fifth signals and outputs ninth signals, a fifth subtracter which subtracts said seventh signals from said sixth signals and outputs tenth signals, a sixth subtracter which subtracts said eighth signals from said seventh signals and outputs eleventh signals, a seventh subtracter which subtracts said ninth signals from said eighth signals and outputs twelfth signals, a control signal generating circuit which is supplied with said sixth, seventh, eighth, ninth, tenth, eleventh and twelfth signals, and outputs a thirteenth signal which is a control signal for which the value changes in accordance with combinations of said sixth, seventh, eighth, ninth, tenth, eleventh and twelfth signals, and a signal selection circuit supplied with said first, second, third, fourth, fifth and thirteenth signals, and which selects and outputs one of said first, second, third, fourth and fifth signals in accordance with said thirteenth signal which is a control signal, said control signal generating circuit outputs (a) a control signal for said signal selection circuit to select and output said fifth signal when values of the five signals of said seventh, eighth, ninth, eleventh and twelfth signals satisfy a first conditions of their values simultaneously being the same polarity for either positive or negative, (b) a control signal for said signal selection circuit to select and output said fourth signal when values of the three signals of said seventh, eighth and eleventh signals all have the same polarity when they are positive or negative at the same time, and when said first condition is not established, and (c) a control signal for said signal selection circuit to select and output said first signal when values of the three signals of said sixth, seventh and eighth signals all have the same polarity when they are positive or negative at the same time, and when the values of said tenth and eleventh signals all have the same polarity when they are positive or negative at the same time, and when there is the establishment of a second condition for the values of a polarity of said tenth and eleventh signals to be a value different from the polarity of a value of said sixth, seventh and eighth signals, (d) a control signal for said signal selection circuit to select and output said second signal when values of the said seventh and eighth signals both have the same polarity when they are positive or negative at the same time, and when the value of the polarity of said eleventh signal is a value which is different from that of the polarity of said seventh and eighth signals, and when said second condition is not established, and (e) a control signal for said signal selection circuit to select and output said third signal when combinations of values of the seven signals of said sixth, seventh, eighth, ninth, tenth, eleventh and twelfth signals are other than the combinations described above, wherein an output signal for which an edge of an envelope of first signals which are said input signals is emphasized.

* * * * *